(12) United States Patent
Burke et al.

(10) Patent No.: US 8,458,484 B2
(45) Date of Patent: Jun. 4, 2013

(54) PASSWORD GENERATOR

(75) Inventors: Christopher John Burke, Queensland (AU); David Victor Murray, New South Wales (AU)

(73) Assignee: Microlatch Pty Ltd, Hurtsville, New South Wales ( * ) Notice: Subject to any disclaimer, the term of this patent is extended or adjusted under 35 U.S.C. 154(b) by 472 days.

(21) Appl. No.: 12/366,101

(22) Filed: Feb. 5, 2009

(65) Prior Publication Data

US 2009/0282258 A1 Nov. 12, 2009

Related U.S. Application Data

(63) Continuation-in-part of application No. PCT/AU2007/001253, filed on Aug. 30, 2007.

(30) Foreign Application Priority Data

| Sep. 12, 2006 | (AU) | 2006905032 |
| Feb. 13, 2008 | (AU) | 2008900672 |
| Feb. 4, 2009 | (AU) | 2009200408 |

(51) Int. Cl.
*G06F 21/00* (2006.01)
(52) U.S. Cl.
USPC ............ 713/184; 713/185; 713/186; 713/166
(58) Field of Classification Search
USPC .................. 713/183, 184, 185, 186
See application file for complete search history.

(56) References Cited

U.S. PATENT DOCUMENTS

| 5,280,527 | A | * | 1/1994 | Gullman et al. | 713/184 |
| 5,564,106 | A | * | 10/1996 | Puhl et al. | 380/286 |
| 6,598,161 | B1 | * | 7/2003 | Kluttz et al. | 713/166 |
| 6,687,375 | B1 | * | 2/2004 | Matyas et al. | 380/45 |
| 7,362,865 | B2 | * | 4/2008 | Karp | 380/270 |
| 2003/0126434 | A1 | * | 7/2003 | Lim et al. | 713/164 |
| 2004/0005057 | A1 | * | 1/2004 | Jang et al. | 380/270 |
| 2005/0253683 | A1 | | 11/2005 | Lowe | |
| 2007/0107051 | A1 | * | 5/2007 | Carter | 726/21 |
| 2008/0263363 | A1 | * | 10/2008 | Jueneman et al. | 713/184 |

FOREIGN PATENT DOCUMENTS

| WO | 99/34554 | 7/1999 |
| WO | 02/088932 | 11/2002 |
| WO | 02/088932 A1 | 11/2002 |

OTHER PUBLICATIONS

Kevin Poulsen, "Garage Door DMCA Case Dismissed," Nov. 14, 2003, Secuirity Focus News.*
Brochure by UPEK, Inc. advertising the Eikon Fingerprint Reader, 2 pages, 2006.

(Continued)

*Primary Examiner* — Philip Chea
*Assistant Examiner* — Kendall Dolly
(74) *Attorney, Agent, or Firm* — Ladas & Parry LLP

(57) ABSTRACT

A system (100) for providing secure access to a controlled application is disclosed. The system (100) comprises a database (105) of one or more biometric signatures. The system (100) also comprises a first subsystem (116) comprising a biometric sensor (121) for receiving a biometric signal and means for matching the biometric signal against members of the database (105) of biometric signatures to thereby determine an authentication signal. The first subsystem (116) also comprises means for generating a password dependent upon the authentication signal, the password being generated according to an encryption process based on a dynamic input value. The system (100) also comprises a second sub-system (117) comprising means for receiving the password and means for providing access to the controlled application dependent upon the password.

22 Claims, 13 Drawing Sheets

OTHER PUBLICATIONS

Bradshaw, Tim, "The identity code", *Information Age*, Jun. 26, 2006, pp. 1-4.

Brochure by VASCO Data Security, Inc. advertising the DIGIGPASS GO 3™, 2 pages, 2003.

"Ultra-portable, Strong Authentication for highest convenience and user Acceptability", *VASCO*, http://www.vasco.com/products/product.html?product=47, 2006.

SafeWord PremierAccess: Event-synchronous tokens versus time-dependent tokens, *Secure Computing*, pp. 1-13, accessed on Sep. 6, 2006.

Press Release, one page, "Computer security tokens", *Privaris*, accessed on Mar. 12, 2008.

Supplementary European Search Report dated Nov. 19, 2012 for Application No. EP 07784873.7-2415.

* cited by examiner

PASSWORD GENERATOR

This application is a continuation-in-part of copending International Application No. AU2007/001253 filed on Aug. 30, 2007 which designated the U.S., claims the benefit thereof and incorporates the same by reference.

FIELD OF THE INVENTION

The present invention relates to secure access systems and, in particular, to a password generator for use in providing secure access to a controlled application, such as an Internet banking website.

BACKGROUND

Identity theft is on the increase. It was recently reported that during 2005, 8.9 million people were affected by identity theft, at a total cost to business and individuals of US$56.6 billion. The cost per victim of this identity theft averaged US$6,383. These figures are expected to rise in the future as fraudsters devise smarter, more focused scams.

A major portion of the above identity theft is online identity theft. In that context, businesses with valuable intellectual property or electronically accessible financial assets are largely left to protect themselves. In most situations, these businesses have succeeded in securing their own networks, but that leaves the more daunting task of protecting a greater point of weakness—their customers.

While network and application security and back-end fraud detection are crucial elements in preventing fraud, many of the online security attacks today are targeted at individuals. As a result, companies are starting to deploy to customers stronger kinds of authentication. For example, one large multinational bank recently announced that it was deploying a security device in the form of a "one-time dynamic password generator" for their customers to use in accessing personal Internet banking.

One-time password generators are used to provide time dynamic passwords that are short enough for a user to enter into an authentication system. The one-time password generators are used to replace digital certificates which had previously been used for on-line security. The password generators are typically in the form of a remote fob (which is a small portable device carried by the user) comprising an on-board micro-processor, a button and a liquid crystal display (LCD) display. Upon a user pressing the button of the password generator, the micro-processor generates a one-time password.

In order to log on to a controlled application, such as the bank's Internet banking website, using one of the above one-time password generators, the user enters their user ID and a fixed (or static) password into the banking website using a personal computer, for example. The user then presses the button on the one-time password generator and a six (or greater number) digit password is generated by the password generator and is displayed on the LCD. The user then enters the six digit password into the banking website via a personal computer, for example. The server that hosts the banking website (hereinafter "the authentication server") performs the same calculation as the user's password generator and then compare a resulting six digit value to the password provided by the user. If the one-password provided the user matches the value calculated by the server, the user's identity is confirmed prior to the user being allowed to carry out their personal Internet banking using the banking website.

The above one-time password generators typically function by taking an input value, encrypting the input value according to an encryption algorithm (e.g., RSA, Public Key Infrastructure (PKI), Data Encryption Standard (DES), Blowfish, International Data Encryption Algorithm (IDEA)), and displaying the result as the one-time password. The encryption algorithm uses a secret key stored within each password generator as part of the process to generate the password. Changing the secret key causes a different password to be generated, even if the same input value is used. The secret keys are assigned to specific users and thus tie the user to a specific password generator. The authentication server also has a copy of the user's secret key. As such, the authentication server can perform the same calculation as the user's password generator by taking the same input and calculating the correct one-time password.

There are two commonly used types of one-time password generators, namely "time-dependent" and "event-synchronous". Time dependent password generators require a clock to be configured within the password generator and within the authentication server. Time dependent password generators take the current time as the input value. For example, every 20 seconds a time dependent password generator may read the time from their clock and use the time as the input value to generate a one-time password. The input value is then encrypted using the user's secret key as part of the encryption process. The resulting encrypted number becomes the one-time password. Time-dependent password generators are referred to as synchronous since both the time-dependent password generator and the authentication server obtain their input values from the time of day which should be, in theory, always the same. However, in reality, some host system clocks drift, requiring a system administrator to manually set the clock periodically. In contrast, the clocks in password generators cannot be set and may drift throughout the lifetime of the password generator. To accommodate the varying times within the time-dependent password generators, the authentication server typically has a window allowing the passwords to be some period of time (e.g., two (2) minutes) off.

Event-synchronous password generators do not rely on an internal clock and are therefore not subject to the same drift as time-dependent password generators. Instead, event-synchronous password generators use a simple counter as the input value. The internal counter is set to zero when a password generator is first initialised by a user. From that point on, each time an event occurs (e.g., when the user requests a new password), the counter is incremented and the incremented value is used as the input value. This input value is then encrypted with the result becoming the one-time password. Similarly, a counter is also associated with the user's account on the authentication server. This authentication server clock is initialised to zero when the account is created, and is incremented each time the user is authenticated.

Other types of password generators also exist, such as "asynchronous challenge/response" password generators which select a random number as input value to the encryption process.

Prior to using a one-time password generator, the password generator must be initialised, as mentioned above. Password generator initialisation again requires correct entry of the user's ID and fixed password into the controlled application (e.g., the Internet banking website). The user is then required to enter in a ten digit serial number located on the back of the password generator together with designated digits from the user's bank passport number into the banking website. However, one problem with the one-time password generators is that if a fraudster is able to gain access to a user's personal Internet banking details, the fraudster will be able to activate the password generator and perform fraudulent Internet banking transactions using the password generator.

Thus a need clearly exists for a more efficient password generator for use in providing secure access to a controlled application.

SUMMARY

It is an object of the present invention to substantially overcome, or at least ameliorate, one or more disadvantages of existing arrangements.

According to one aspect of the present invention there is provided a system for providing secure access to a controlled application, the system comprising:
- a database of one or more biometric signatures;
- a first sub-system comprising:
  - a biometric sensor for receiving a biometric signal;
  - means for matching the biometric signal against members of the database of biometric signatures;
  - means for determining a class of user associated with said biometric signal based on the matched biometric signature; and
  - means for generating a password according to an encryption process based on a dynamic input value, wherein said password is dependent on the determined class of user; and
- a second sub-system comprising;
  - means for receiving the password; and
  - means for providing access to the controlled application at a level dependent upon said password.

According to another aspect of the present invention there is provided a first sub-system for operating in a system for providing secure access to a controlled application, the system comprising a database of biometric signatures, a second sub-system comprising means for receiving a password, and means for providing access to the controlled application dependent upon the password, the first subsystem comprising:
- a biometric sensor for receiving a biometric signal;
- means for matching the biometric signal against members of the database of biometric signatures
- means for determining a class of user associated with said biometric signal based on the matched biometric signature; and
- means for generating the password according to an encryption process based on a dynamic input value, wherein said password is dependent on the determined class of user associated with said biometric signal.

According to still another aspect of the present invention there is provided a password generator for providing secure access to a controlled application executing within a system, the system comprising a database of biometric signatures, a sub-system comprising means for receiving the password, and means for providing access to the controlled application dependent upon the password, said password generator comprising:
- a biometric sensor for receiving a biometric signal;
- a processor for matching the biometric signal against members of the database of biometric signatures, for determining a class of user associated with said biometric signal based on the matched biometric signature, and for generating the password according to an encryption process based on a dynamic input value, wherein said password is dependent on the determined class of user associated with said biometric signal.

According to still another aspect of the present invention there is provided a method for providing secure access to a controlled application, the method comprising the steps of:
- receiving a biometric signal;
- matching the biometric signal against members of a database of biometric signatures;
- determining a class of user associated with said biometric signal based on the matched biometric signature;
- generating a password according to an encryption process based on a dynamic input value, said password being dependent on the determined class of user; and
- providing access to the controlled application at a level dependent upon said password.

According to still another aspect of the present invention there is provided a method for populating a database of biometric signatures in a system for providing secure access to a controlled application, the system comprising said database of biometric signatures, a first subsystem comprising a biometric sensor for receiving a biometric signal, and means for generating a password capable of granting access to the controlled item, said password being generated according to an encryption process based on a dynamic input value, and a second sub-system comprising means for receiving the password, and means for providing access to the controlled item dependent upon said password, said method comprising the steps of:
- receiving a series of entries of the biometric signal;
- determining at least one of the number of said entries and a duration of each said entry;
- mapping said series into an instruction; and
- populating the database according to the instruction.

According to still another aspect of the present invention there is provided a method generating a password in a system for providing secure access to a controlled application, the system comprising a database of biometric signatures, a first sub-system comprising means for receiving the password generated by a second sub-system, and means for providing access to the controlled application dependent upon the password, said method comprising the steps of:
- receiving a biometric signal by biometric sensor;
- matching the biometric signal against members of the database of biometric signatures
- means for determining a class of user associated with said biometric signal based on the matched biometric signature; and
- generating the password according to an encryption process based on a dynamic input value, wherein said password is dependent on the determined class of user.

According to still another aspect of the present invention there is provided a computer program product having a computer readable medium having a computer program recorded therein for directing a processor to provide secure access to a controlled application, said computer program product comprising:
- code for receiving a biometric signal;
- code for matching the biometric signal against members of a database of biometric signatures
- code for determining a class of user associated with said biometric signal based on the matched biometric signature;
- code for generating a password according to an encryption process based on a dynamic input value, said password being dependent on the determined class of user; and
- code for providing access to the controlled application dependent upon said password.

According to still another aspect of the present invention there is provided a computer program product having a computer readable medium having a computer program recorded therein for directing a processor to execute a method for populating a database of biometric signatures in a system for providing secure access to a controlled application, the system comprising said database of biometric signatures, a first subsystem comprising a biometric sensor for receiving a biometric signal, and means for generating a password capable of granting access to the controlled application, and a second sub-system comprising means for receiving the password, and means for providing access to the controlled application dependent upon the password, said program comprising:

code for receiving a series of entries of the biometric signal;

code for determining at least one of the number of said entries and a duration of each said entry;

code for mapping said series into an instruction; and code for populating the database according to the instruction.

According to still another aspect of the present invention there is provided a computer program product having a computer readable medium having a computer program recorded therein for directing a processor to generate a password for providing secure access to a controlled application, said computer program product comprising:

code for receiving a biometric sensor by biometric signal;

code for matching the biometric signal against members of the database of biometric signatures;

code for determining a class of user associated with said biometric signal based on the matched biometric signature; and code for generating the password according to an encryption process based on a dynamic input value, said password being dependent on the determined class of user.

According to still another aspect of the present invention there is provided a system for providing secure access to a software application, the system comprising:

a database of one or more biometric signatures;

a first subsystem comprising:

a biometric sensor for receiving a biometric signal;

means for matching the biometric signal against members of the database of biometric signatures to thereby determine an authentication signal; and means for generating a password dependent upon said authentication signal, said password being generated according to an encryption process based on a dynamic input value; and a second sub-system comprising;

means for receiving the password; and means for providing access to the software application dependent upon said password.

According to still another aspect of the present invention there is provided a password generator for providing secure access to a software application executing within a system, the system comprising a database of biometric signatures, a sub-system comprising means for receiving the password, and means for providing conditional access to the software application dependent upon the password, said password generator comprising:

a biometric sensor for receiving a biometric signal;

a processor for matching the biometric signal against members of the database of biometric signatures to thereby determine an authentication signal, and for generating the password dependent upon said authentication signal, wherein said password is generated according to an encryption process based on a dynamic input value.

According to still another aspect of the present invention there is provided a method for providing secure access to a controlled application, the method comprising the steps of:

receiving a biometric signal;

matching the biometric signal against members of a database of biometric signatures to thereby output an authentication signal;

generating a password dependent upon said authentication signal, said password being generated according to an encryption process based on a dynamic input value; and providing conditional access to the controlled application dependent upon said password.

According to still another aspect of the present invention there is provided an apparatus for providing secure access to a controlled application executing within a system, the system comprising a database of biometric signatures, a sub-system comprising means for receiving the password, and means for providing conditional access to the controlled application dependent upon the password, said apparatus comprising:

a biometric sensor for receiving a biometric signal;

a processor for matching the biometric signal against members of the database of biometric signatures to thereby determine an authentication signal, and for generating the password dependent upon said authentication signal, wherein said password is generated according to an encryption process based on a dynamic input value.

Other aspects of the invention are also disclosed.

Other aspects of the invention are also disclosed.

BRIEF DESCRIPTION OF THE DRAWINGS

Some aspects of the prior art and one or more embodiments of the present invention are described with reference to the drawings, in which.

DETAILED DESCRIPTION INCLUDING BEST MODE

Figure 1:
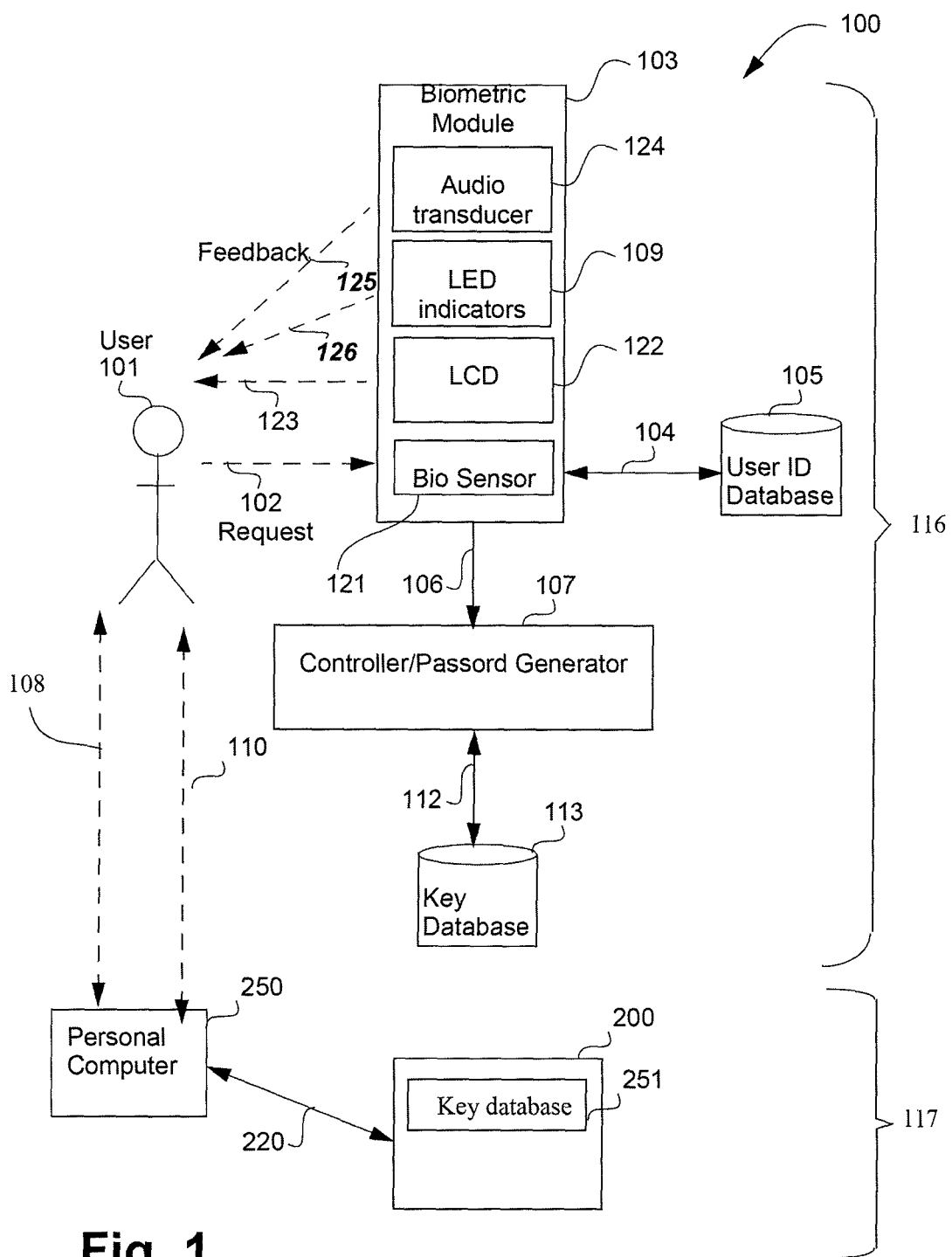
FIG. 1 is a functional block diagram of an arrangement for providing secure access according to the present disclosure.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

FIG. 1 is a functional block diagram of a system 100 for providing secure access to a controlled application according to one arrangement. In the present example, the controlled application is an Internet banking application being hosted by an authentication server 200 (see FIG. 2). Alternatively, the controlled application may be any other type of Internet application (e.g., a social networking or gaming website). In another alternative, the controlled application may be a software application executing on a local network (e.g., a corporate application being used by employees of a corporation). For example, the system 100 may be used by employees when logging onto a local corporate network via a personal computer.

A user 101 provides their user ID and fixed (or static) password to the authentication server 200, as depicted by an arrow 108, using a personal computer 250 connected to the authentication server 200 via a communications network 220. The user 101 then makes a request (or generates a biometric signal), as depicted by an arrow 102, to a biometric module 103. The biometric module 103 includes a biometric sensor 121 and the request 102 takes a form which corresponds to the nature of the sensor 121 in the module 103. Thus, for example, if the biometric sensor 121 in the biometric module 103 is a fingerprint sensor, then the request 102 typically takes the form of a thumb press on a sensor panel (not shown) on the biometric module 103. Other physical attributes that can be used to provide the request 102 include voice, retinal or iris pattern, face pattern, palm configuration, vein pattern and so on. In this instance, the biometric module 103 would require the corresponding biometric sensor.

The biometric module 103 interrogates, as depicted by an arrow 104, a user identity database 105. Thus for example if the request 102 is the thumb press on the biometric sensor panel 121 then the user database 105 contains one or more biometric signatures for each of one or more authorised users against which the request 102 can be authenticated. If the identity of the user 101 is authenticated successfully, then the biometric module 103 sends an authentication signal 106 to a controller/password generator 107. As described below, the authentication signal 106 may comprise one or more user defined bits which may be used to effect certain control functions in the controller/password generator 107. The controller/password generator 107 accesses a key stored in a key database 113, as depicted by the arrow 112, and generates a one-time password using the key and the current time which the controller/password generator 107 determines from a clock 118 (see FIG. 8). As described in detail below, the key accessed by the controller/password generator 107 may depend on the user 101 and unique passwords may be generated for a particular user. In the present example, the password is generated using the RSA encryption algorithm. However, any suitable encryption algorithm may be used (e.g., Data Encryption Standard (DES), Blowfish, International Data Encryption Algorithm (IDEA)).

The biometric module 103 also incorporates at least one mechanism for providing feedback to the user 101. This mechanism can, for example, take the form of a Liquid Crystal Display 122 which can provide visual feedback, depicted by an arrow 123, to the user 101. For example, the password generated by the controller/password generator 107 is provided to the user 101 using the Liquid Crystal Display 122. Alternately, or in addition, the mechanism can take the form of an audio signal provided by an audio transducer 124 providing audio feedback 125. Still further, (again, alternately or in addition to) the mechanism can take the form of one or more Light Emitting Diode (LED) indicators 109 providing visual feedback 126. The user then provides the generated password to the authentication server 200, as depicted by an arrow 110, again, via the personal computer 250 and the communications network 220.

The system 100 in FIG. 1 has been described for the case in which the controller/password generator 107 generates a password using the current time as the input value to the encryption process. It is noted that this is merely one arrangement, and other input values such as a simple counter value or a random number may be used as with the event-synchronous tokens and the asynchronous challenge/response tokens, respectively, described above.

Further, other mathematical algorithms or codes can equally be used to generate the one-time password. For example, the password may be generated using a rolling code to generate a different code variant each time the password is generated. In this instance, successive passwords may be generated using a code and/or a look-up table known to both the biometric module 103 and the authentication server 200. Using this approach successive numbers are modified, resulting in a non-repeatable number.

The biometric module 103, the database 105, the controller/password generator 107, the database 113, may be implemented as a first sub-system 116 of the system 100, in a number of different forms. The first sub-system 116 can for example be incorporated into a remote fob (e.g., a key fob carried by the user 101), or alternately can be mounted in a protected enclosure positioned adjacent to the personal computer 250. In one arrangement, first sub-system 116 may be incorporated within a mobile telephone, personal data assistant (PDA) or the like.

The personal computer 250 and the authentication server 200 can be referred to as a second sub-system 117.

The biometric signature database 105 is shown in FIG. 1 to be part of the first sub-system 116. However, in an alternate arrangement, the biometric signature database 105 can be located in the personal computer 250, in which case communication 104 between the biometric module 103 and the signature database 105 can be performed over a secure wireless communication channel. For example, the biometric signature of the authorised user may be stored on a hard disk drive (not shown) of the personal computer 250.

When the sub-system 116 including the biometric module is implemented as a remote fob, the fob incorporates the biometric (e.g., fingerprint) database 105, in which case only a small number (e.g., one or more for a user's hand) biometric signatures are typically stored in the fob. However, the database 105 within the fob may contain biometric for a plurality of users associated with the fob.

The incorporation of the biometric sensor 121 into the biometric module 103 in the form of a remote fob also means that if the user 101 loses the remote fob, the user need not be concerned that someone else can use it. Since the finder of the lost fob will not be able to have his or her biometric signal authenticated by the biometric sensor 121 in the biometric module 103, the lost fob is useless to anyone apart from the rightful user 101.

The first sub-system 116 is preferably fabricated in the form of a single integrated circuit (IC) to reduce the possibility of an authorised person bypassing the biometric sensor 121 in the biometric module 103 and directly forcing the controller/password generator 107 to generate the password.

Figure 3:
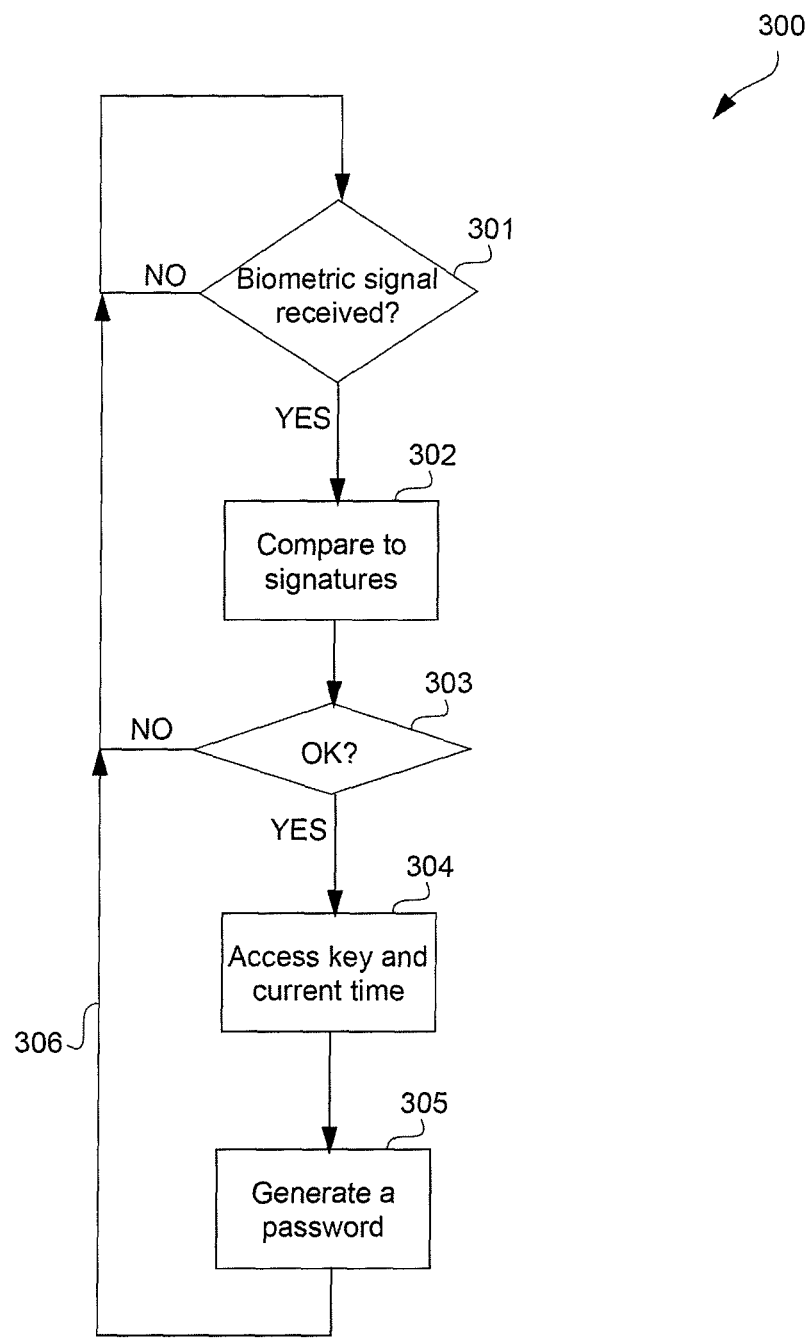
FIG. 3 shows an example of a method of operation of the control module of FIG. 1.

FIG. 3 shows the method 300 of operation of the first sub-system 116 of FIG. 1. The method 300 may be implemented as software resident within memory 1006 (see FIG. 8) of the biometric module 103 and being controlled in its execution by processor 1005. The method 300 commences with a testing step 301 in which the biometric sensor 121 in the biometric module 103 checks whether a biometric signal 102 is being received. The biometric sensor 121 may continually communicate with processor 1005 in relationship to the biometric signal 102 being received.

If the biometric signal has not been received, then the process 300 is directed in accordance with a NO arrow back to the step 301 in a loop. If, on the other hand, the biometric signal 102 has been received, then the process 300 is directed in accordance with a YES arrow to a step 302. At step 302, the processor 1005 of the biometric module 103 compares the received biometric signal 102 with information in the biometric signature database 105 in order to ensure that the biometric signal 102 received is that of the rightful user 101 of the sub-system 116.

A subsequent testing step 303 checks whether the comparison in the step 302 yields the desired authentication. If the biometric signature matching is authenticated, then the processor 1005 of the biometric module 103 sends an authentication signal 106 to the controller/password generator 107 and the process 300 is directed in accordance with a YES arrow to a step 304. At step 304, the controller/password generator 107 accesses a key stored in the key database 113 and determines the current time from the clock 118. The key database 113 may be configured within the memory 1006 and the controller/password generator 107 may access the key in conjunction with the processor 1005. In the subsequent step 305, the controller/password generator 107 generates a one-time password using the key and the current time. As described in detail below, the authentication signal 106 may comprise one or more user defined bits. The user defined bits may be used by the controller/password generator 107 for determining what key to access and therefore what password to generate.

In the method 300, the controller/password generator 107 uses the accessed key to encrypt a value representing the current time, using the RSA encryption algorithm. However, any suitable encryption algorithm may be used (e.g., Data Encryption Standard (DES), Blowfish, International Data Encryption Algorithm (IDEA)). The method 300 is then directed in accordance with an arrow 306 back to the step 301.

Returning to the testing step 303, if the signature comparison indicates that the biometric signal 102 is not authentic, and has thus not been received from the proper user, then the method 300 is directed in accordance with a NO arrow back to the step 301. In an alternate arrangement, the NO arrow from the step 303 could lead to a disabling step which would disable further operation of the first sub-system 116, either immediately upon receipt of the incorrect biometric signal 102, or after a number of attempts to provide the correct biometric signal 102.

Figure 2:
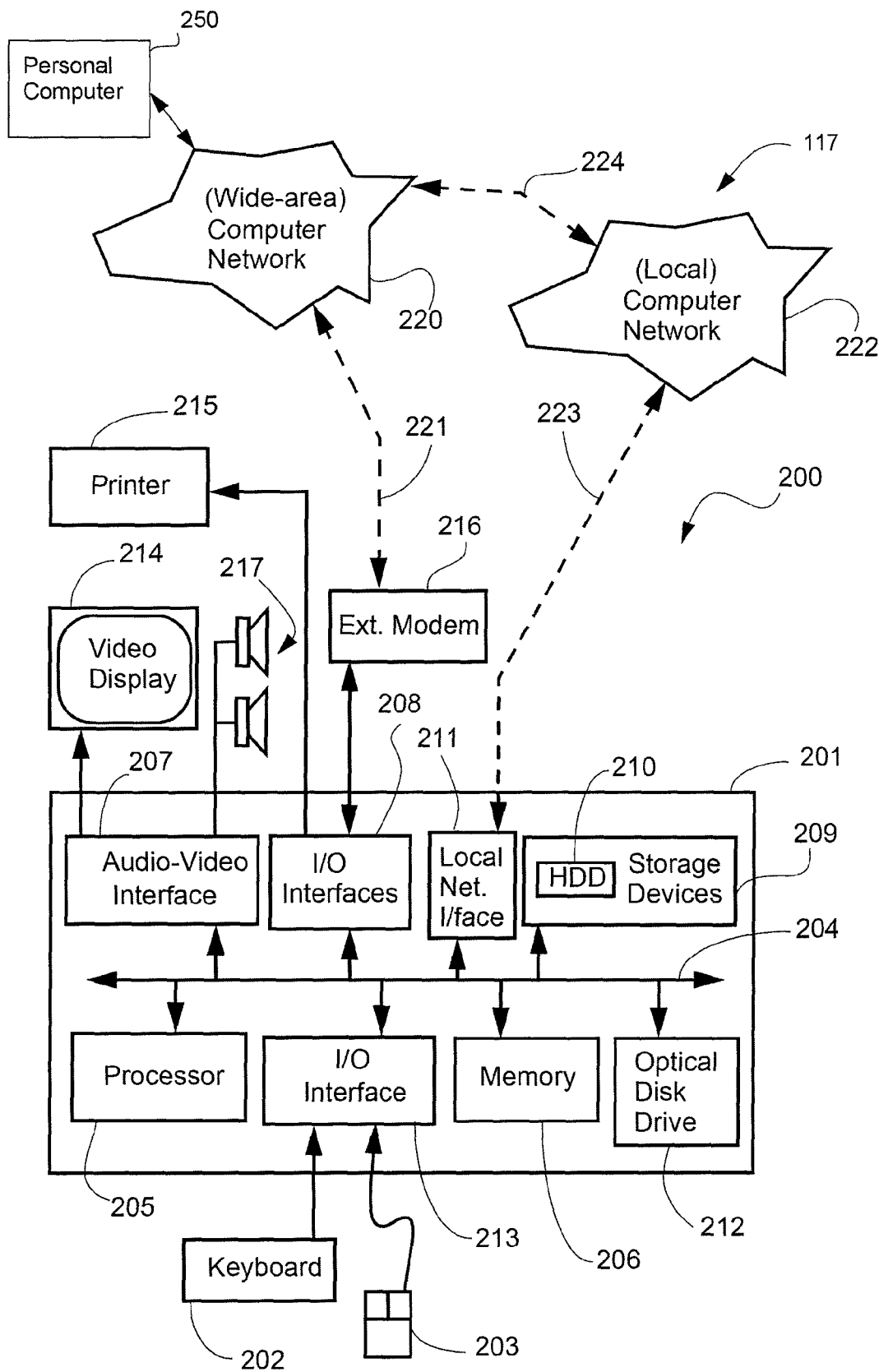
FIG. 2 is a schematic block diagram of a general purpose computer upon which an authentication server can be practiced.
Figure 4:
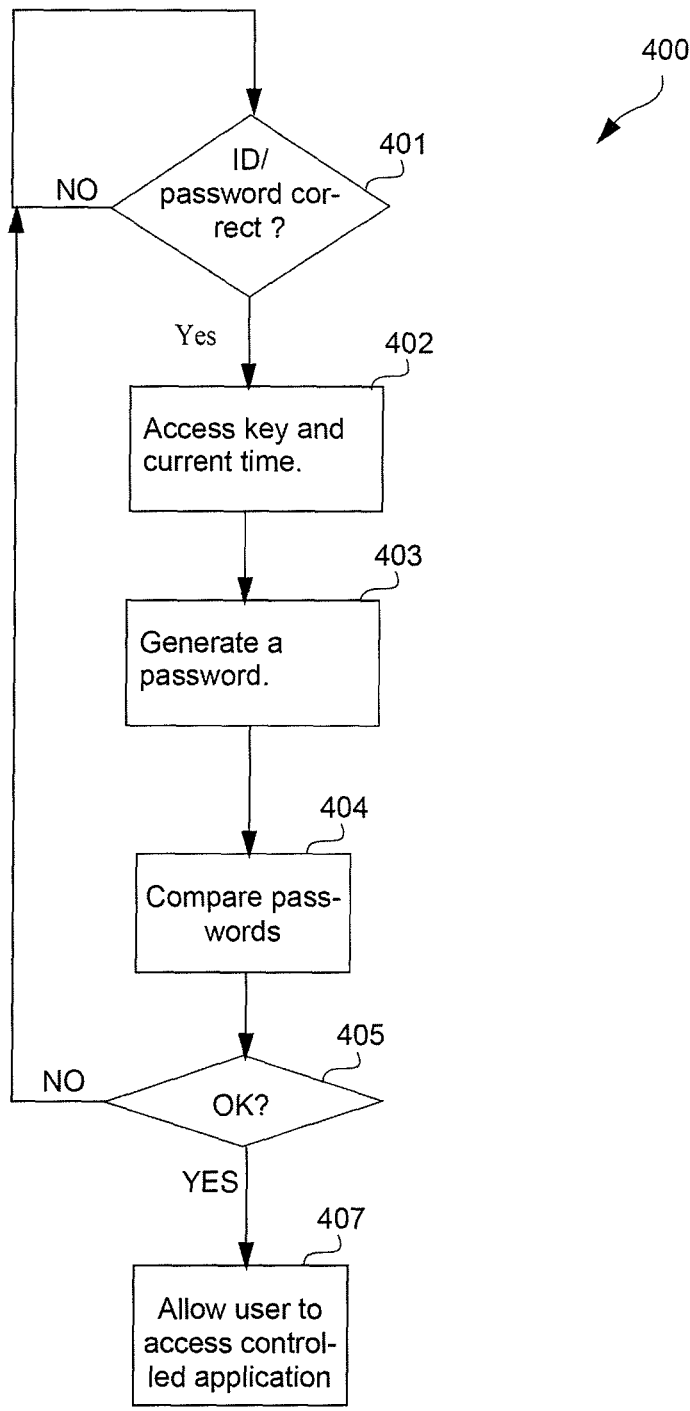
FIG. 4 shows an example of a method of operation of the authentication server of FIG. 2.

FIG. 4 shows the method of operation of the authentication server 200 of FIG. 2. The method 400 may be implemented as software resident within hard disk drive 210 (see FIG. 2) and being controlled in its execution by processor 205. The method 400 commences with a testing step 401 which checks whether the user's ID and fixed password, received via the personal computer 250 and communications network 220, are correct. The step 401 is performed by the authentication server 200 and, in particular, by the processor 205 shown in FIG. 2. If the user's ID and fixed password are incorrect, then the process 400 is directed in accordance with a NO arrow in a looping manner back to the step 401. In an alternate arrangement, the NO arrow from the step 401 may lead to a disabling step which disables further access to the authentication server 200 (and the Internet banking website being hosted thereon) by the user after a number of attempts to provide the correct user ID and fixed password.

When the user's ID and fixed password are correct, the process 400 is directed from the step 401 by means of a YES arrow to a step 402. At step 402, the processor 205 of the authentication server 200 accesses a key (associated with the user of the biometric module 103) stored in a key database 251 and determines the current time from a system clock (not shown). In the present example, the key database 251 is configured within the hard disk drive 210 of the authentication server 200. In a subsequent step 403, the processor 205 of the authentication server 200 generates a one-time password using the key and the current time determined at step 402. In the method 400, the authentication server 200 again uses the accessed key to encrypt a value representing the current time, using the RSA encryption algorithm, which is the same encryption algorithm used by the controller/password generator 107. Accordingly, the authentication server 200 performs the same calculation as the controller/password generator 107 in determining the password In the subsequent step 404, the processor 205 of the authentication server 200 compares the password generated at step 403 with a password received from the user in accordance with the password generated at step 305. A subsequent testing step 405 is performed by authentication server 200. In the step 405 if the password received from the user is successfully matched against the password generated at step 403 then the process 400 is directed in accordance with a YES arrow to a step 407.

In the step 407 the authentication server 200 al lows the user to access the Internet banking website being hosted on the authentication server 200 and the process 400 concludes.

Returning to the testing step 405 if the password received from the user is not successfully matched to the password generated at step 403 by the authentication server 200 then the process 400 is directed from the step 405 in accordance with a NO arrow back to the step 401. In an alternate arrangement, the process 400 may be directed, if the password match is negative, from the step 405 back to step 402 where the authentication server 200 would again access the key stored in the database 251 and determine the current time from the system clock (not shown). This would also require the user to repeat the method 300 in order to generate another one-time password and again provide the generated password to the authentication server 200. Further access to the authentication server 200 by the user 101 may be disabled if the incorrect password where received once or a number of times.

Figure 5:
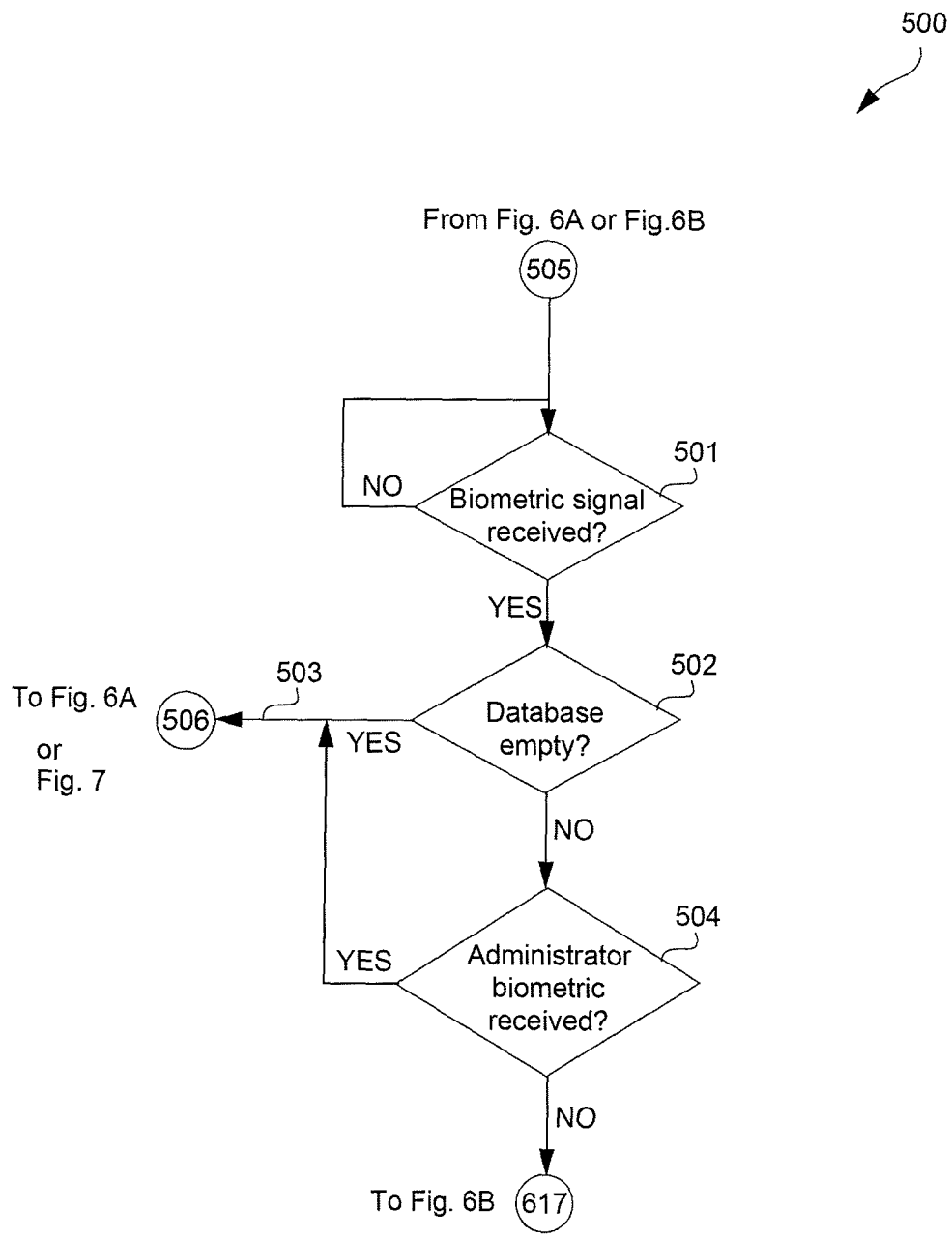
FIG. 5 shows another example of how the secure access system of FIG. 1 operates.

FIG. 5 shows another method 500 of operation of the access system 100 of FIG. 1. The method 500 may be implemented as software resident within the memory 1006 and being controlled in its execution by the processor 1005. The method 500 commences with a step 501 that determines if a biometric signal has been received by the biometric sensor 121 in the biometric module 103 in FIG. 1. If not, then the method 500 follows a NO arrow back to the step 501. If however a biometric signal has been received, then the method 500 follows a YES arrow to a step 502 that determines if the user ID database 105 in FIG. 1 is empty. This would be the case, for example, if the biometric module 103 is new and has never been used, or if the user 101 has erased all the information in the database 105 (as will be described in detail below).

Figure 7:
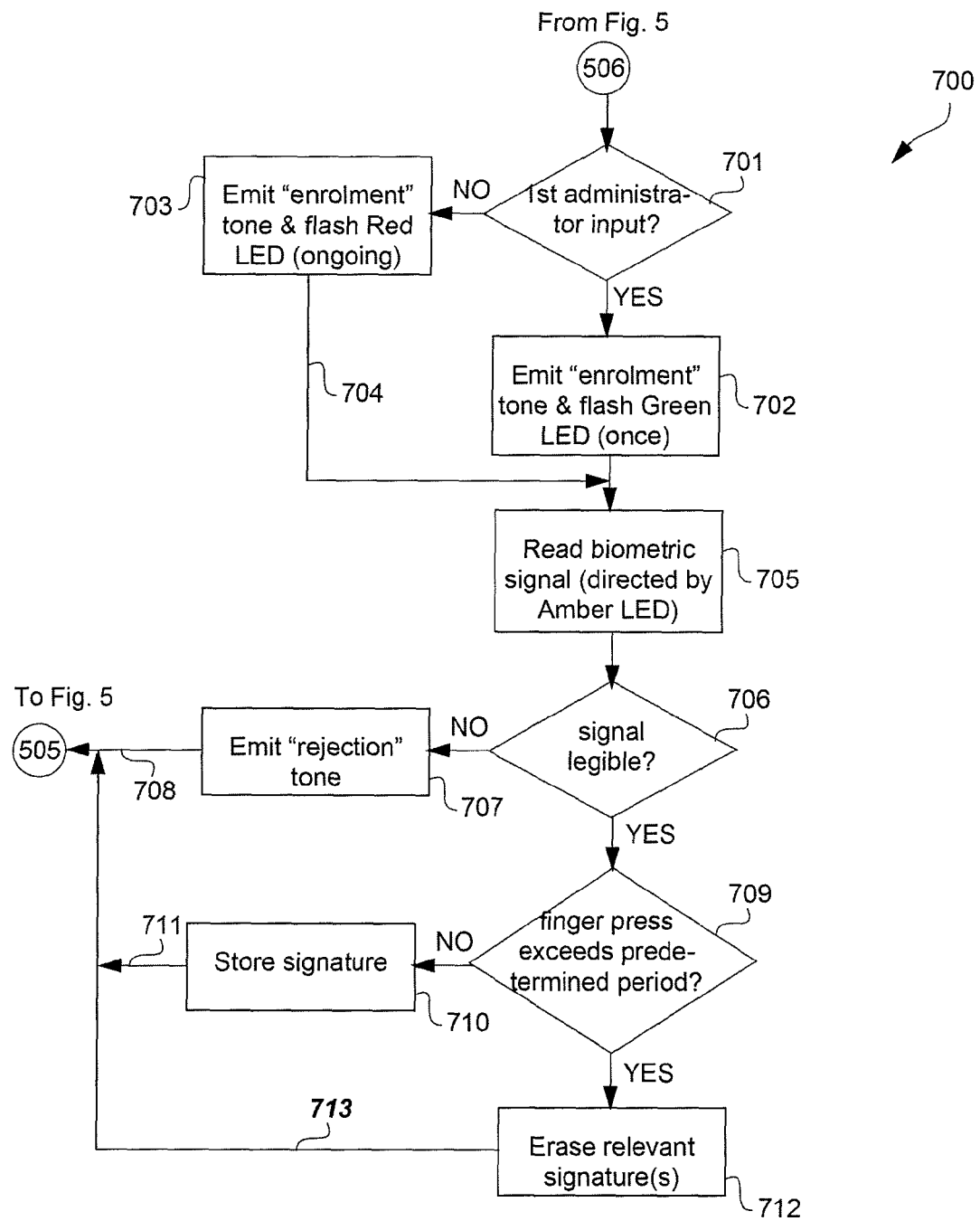
FIG. 7 shows another enrolment method relating to the example of FIG. 5.

If the database 105 is empty, then the method 500 is directed by an arrow 503 to 506 in FIG. 7 which depicts a method 700 dealing with the enrolment or the administration function for loading relevant signatures into the database 105. If on the other hand the database 105 is not empty, then the method 500 is directed to a step 504 that determines if the biometric signal that has been received is an administrator's biometric signal.

The disclosed access system 100 can accommodate a plurality of classes of users, namely administrators, (ordinary) users and duress users. There may also be various classes of ordinary users such as a "preferred" ordinary user or a "normal" ordinary user, as will be described below. Other arrangements may have many more than the above classes of users. The administrators have the ability to amend data stored, for example, in the database 105, while the ordinary users do not have this capability. The first user of the biometric module 103, whether this is the user who purchases the module 103, or the user who programs the module 103 after all data has been erased from the database 105, is automatically categorised as an administrator. This first administrator can direct the access system 100 to either accept further administrators, or alternately to only accept further ordinary users.

Although the present description refers to "users", in fact it is "fingers" which are the operative entities in system operation when the biometric sensor 121 (see FIG. 1) is a fingerprint sensor. In this event, a single user can enrol two or more of his or her own fingers as separate administrators or (ordinary) users, by storing corresponding fingerprints for corresponding fingers in the database 105 via the enrolment method 600 (see FIG. 6A).

Some class overlap is possible. Thus a stored signature can belong to an administrator class.

The first administrator can provide control information to the biometric module 103 by providing a succession of finger presses to the biometric sensor 121, providing that these successive presses are of the appropriate duration, the appropriate quantity, and are input within a predetermined time. In one arrangement, the control information is encoded by either or both (a) the number of finger presses and (b) the relative duration of the finger presses. If the successive finger presses are provided within this predetermined time, then the biometric module 103 accepts the presses as potential control information and checks the input information against a stored set of legal control signals.

One example of a legal control signal can be expressed as follows:

"Enrol an ordinary user"->dit, dit, dit, dah where "dit" is a finger press of one second's duration (provided by the user 101 in response to the feedback provided by the Amber LED as described below), and "dah" is a finger press of two second's duration.

In the event that a legitimate sequence of finger presses are not delivered within the predetermined time, then the presses are considered not to be control information and merely to be presses intended to provide access to the controlled application. Legitimate control sequences are defined in the memory 1006 of the biometric module 103.

The biometric module 103 has feedback signalling mechanisms 122, implemented for example by the LCD 122, and 124, implemented by an audio transducer. The biometric module 103 may also comprise Light Emitting Diodes (LEDs) 109 to signal the state of the biometric module 103 to the user 101, and to direct the administration process. Thus, in one example, three LEDs, being Red, Amber and Green are provided. Alternatively, the LCD 122 may be used to direct the administration process.

When the Amber LED is flashing, it means "Press the sensor". When the Amber LED is steady ON, it means "Maintain finger pressure". When the Amber LED is OFF, it means "Remove finger pressure". When the system 100 enters the enrolment state (depicted by the process 600 in FIG. 6A), then the audio transducer 124 emits the "begin enrolment" signal (dit dit dit dit) and the Red LED flashes. Enrolment of a normal user (according to the step 607 in FIG. 6A) is signalled by the OK audio signal (dit dit) and a single blink of the Green LED. The system 100 entering the enrolment state and the OK signal may alternatively be indicated on the LCD 122.

Figure 6A:
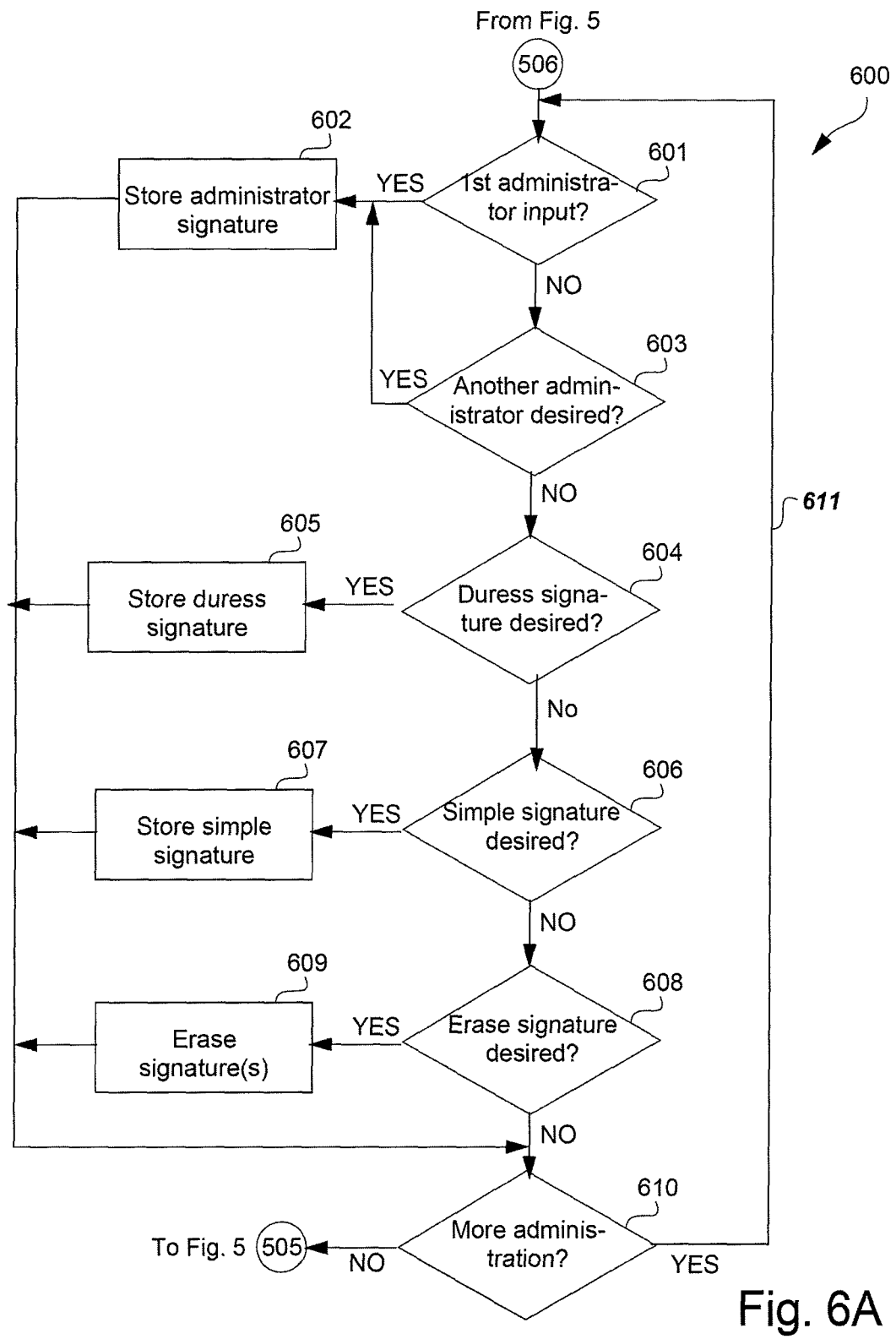
FIG. 6A shows one enrolment method relating to the example of FIG. 5.

Returning to the step 504, if the step determines that the biometric signal received is an administrator's signal, then the method 500 is directed by a YES arrow to 506 in FIG. 6A as depicted by the arrow 503. If on the other hand, the step 504 indicates that the received biometric signal does not belong to an administrator then the process 500 is directed by a NO arrow to 617 in FIG. 6B.

Figure 6B:
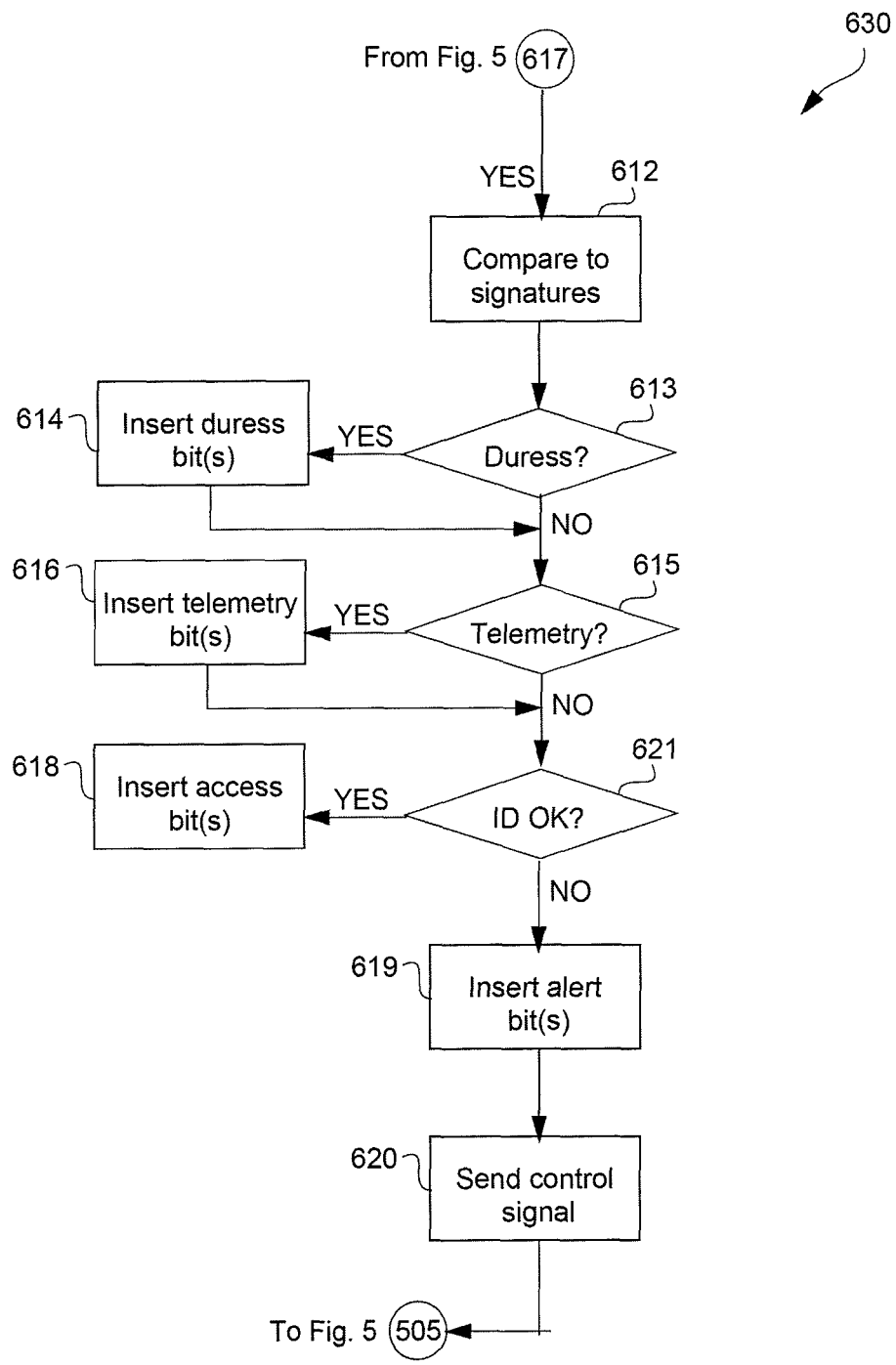
FIG. 6B shows an access method relating to the example of FIG. 5.

FIG. 6B shows the access method 630 by which the biometric signal 102 (see FIG. 1) is processed in order to provide access to controlled application, or take other action. Entering the method at 617 from FIG. 5, the method 630 proceeds to step 612 that compares the received biometric signal 102 to signatures stored in the database 105. A following step 613 determines if the received signal 102 falls into the "duress" category. A signal in the duress category indicates that the user 101 is in a coercive situation where, for example, an armed criminal is forcing the user 101 to access the controlled application. If the step 613 determines that the biometric signal 102 is in the duress class, then a following step 614 prepares a duress bit for incorporation into the authentication signal 106. The aforementioned duress bit is an access attribute of the biometric signal 102. Thereafter the method 630 proceeds to step 615.

Modules used in the biometric module 103 enable a number of user defined bits to be inserted into the authentication signal 106, and these bits may be used to effect desired control functions in the controller/password generator 107. The system 100 utilises four such user bits, namely (a) to indicate that the user belongs to the duress category, (b) to indicate a "battery low" condition, or other desired system state or "telemetry" variable, for the biometric module 103, (c) to indicate that the biometric signal 102 represents a legitimate user in which case the secure access to the controlled application is to be granted, or (d) to indicate that the biometric signal 102 is unknown, in which case the controller 107 may sound an alert tone using a bell (not shown) or the like.

Returning to FIG. 6B, if the step 613 determines that the biometric signal is not in the duress class, then the method 630 proceeds according to a NO arrow to the step 615. The step 615 determines if the biometric module 103 has a low battery condition, in which event the method 630 proceeds according to a YES arrow to a step 616 that prepares a telemetry bit for insertion into the authentication signal 106. The aforementioned telemetry bit is an access attribute of the biometric signal 102. Thereafter, the method 640 proceeds to a step 621.

If the step 615 determines that telemetry signalling is not required, then the method 630 proceeds according to a NO arrow to the step 621. The step 621 checks the biometric signal 102 against the biometric signatures in the database 105. If the received biometric signal 102 matches a legitimate signature in the database 105, then the method 630 is directed to a step 618 that prepares an "access" bit(s) for insertion into the authentication signal 106. These access bits direct the controller/password generator 107 to generate the one-time password. The aforementioned access bits are access attributes of the biometric signal 102. The method 630 then proceeds to a step 620. The access bits may also be configured to indicate the class of an ordinary user (e.g., "preferred" or "normal").

If the step 621 determines that the biometric input signal does not match any legitimate biometric signatures in the database 105, then the method 630 proceeds according to a NO arrow to a step 619 that prepares an "alert" bit for insertion into the authentication signal 106. The aforementioned alert bit is an access attribute of the biometric signal 102. This alert bit directs the controller 107 (a) not to generate the one-time password, and (b) to provide an alert tone, like ringing a chime or a bell (not shown), to alert the user 101 and any one in the vicinity that an unauthorised user is attempting to gain access to the controlled application. The method 630 of FIG. 6B is then directed to the step 620 which inserts the defined bits into the authentication signal 106 and sends the signal 106 to the controller 107.

FIG. 6A shows a method 600 for implementing various enrolment procedures. Again, the method 600 may be implemented as software resident within the memory 1006 and being controlled in its execution by the processor 1005. The method 600 commences at 506 from FIG. 5 after which a step 601 determines if the biometric signal is a first administrators input (which is the case if the database 105 is empty). If this is the case, then the method 600 is directed to a step 602 that stores the administrator's signature in the database 105. From a terminology perspective, this first administrator, or rather the first administrator's first finger (in the event that the biometric sensor 121 in FIG. 1 is a fingerprint sensor), is referred to as the "superfinger". Further administrator's fingers are referred to as admin-fingers, and ordinary users fingers are referred to merely as "fingers". The reason that someone would enrol more than one of their own fingers into the system 100 is to ensure that even in the event that one of their enrolled fingers is injured, the person can still operate the system 100 using another enrolled finger.

It is noted that the step 602, as well as the steps 605, 607 and 609 involve sequences of finger presses on the biometric sensor 121 in conjunction with feedback signals from the LEDs 109, the LCD 122 and/or the audio speaker 124. The method 600 then proceeds to a step 610 that determines if further enrolment procedures are required. If this is the case, then the method 600 proceeds by a YES arrow back to the step 601. If no further enrolment procedures are required, then the method 600 proceeds by a NO arrow to 505 in FIG. 5.

Returning to the step 601, if the biometric signal is not a first administrator's signal, then the method 600 proceeds by a NO arrow to a step 603. The step 603 determines if a further administrator signature is to be stored. It is noted that all signatures stored in the database 105 are tagged as belonging to one or more of the classes of administrator and ordinary user. For example, the ordinary user signatures may be classed (or categorised) as preferred or normal via a tag stored with the signatures. If a further administrator signature is to be stored, then the method 600 proceeds by a YES arrow to the step 602 that stores the biometric signal as a further administrator's signature.

If a further administrator's signature is not required, then the method 600 proceeds according to a NO arrow to a step 604 that determines if a duress signature is to be stored. If this is the case then the method 630 follows a YES arrow to a step 605 that stores a duress signature. The method 600 then proceeds to step 610. If however the step 604 determines that a duress signature is not required, then the method 600 proceeds by a NO arrow to step 606.

The step 606 determines if a further simple signature (ie belonging to an ordinary user) is to be stored. If a further simple signature is to be stored, then the method 600 proceeds by a YES arrow to the step 607 that stores the biometric signal as a further ordinary signature. The simple signatures may also be categorised at step 607 by the administrator to be in different classes. For example, the administrator may classify a simple signature as "preferred" (i.e., belonging to a preferred ordinary user) or "normal" as belonging to a normal ordinary user, by storing a respective tag with the signatures.

If a further simple signature is not required, then the method 600 proceeds according to a NO arrow to a step 608 that determines if any or all signatures are to be erased from the database 105. If this is the case then the method 600 follows a YES arrow to a step 609 that erases the desired signatures. The method 600 then proceeds to the step 610. If however the step 608 determines that no signatures are to be erased, then the method 600 proceeds by a NO arrow to the step 610.

FIG. 7 shows another enrolment method 700 relating to the example of FIG. 5. The method 700 may be implemented as software resident within the memory 1006 and being controlled in its execution by the processor 1005. The method 700 commences at 506 from FIG. 5 after which a step 701 determines if the received biometric signal comes from the first administrator. If this is the case, then the method 700 proceeds according to a YES arrow to a step 702. The step 702 emits an "Enrolment" tone and flashes the green LED once only. Alternatively, the first administrator may be indicated by the LCD 122 displaying the term "first administrator". Thereafter, a step 705 reads the incoming biometric signal which is provided by the user as directed by the Amber LED. When the Amber LED flashes continuously, this directs the user to "Apply Finger". When the Amber LED is in a steady illuminated state, this directs the user to "Maintain Finger Pressure". Finally, when the amber LED is off, this directs the user to "Remove Finger".

Returning to the step 701, if the incoming biometric signal does not belong to the first administrator, then the method 700 proceeds according to a NO arrow to a step 703. The step 703 emits an "Enrolment" tone, and flashes the Red LED in an on-going fashion. Thereafter, the method 700 proceeds according to an arrow 704 to the step 705. Again, in an alternative arrangement the LCD 122 may be used to prompt the user 101.

Following the step 705, a step 706 determines whether the incoming biometric signal is legible. If this is not the case, then the method 700 proceeds according to a NO arrow to a step 707. The step 707 emits a "Rejection" tone, after which the method 700 is directed, according to an arrow 708 to 505 in FIG. 5. Again, the rejection may be indicated with the term "Rejected" displayed on the LCD 122. Returning to the step 706, if the incoming biometric signal is legible, then the method 700 follows a YES arrow to a step 709. The step 709 determines whether the finger press exceeds a predetermined time. If this is not the case, then the method 700 follows a NO arrow to a step 710 which stores the biometric signal, which in the present case is a fingerprint signature. Thereafter the method 700 follows an arrow 711 to 505 in FIG. 5.

Returning to the step 709 if the finger press does exceed the predetermined period, then the method 700 follows a YES arrow to a step 712. The step 712 erases relevant signatures depending upon the attributes of the incoming biometric signal. Thus, for example, if the incoming biometric signal belongs to an ordinary user, then the ordinary user's signature in the database 105 is erased by the step 712. If, on the other hand, the incoming biometric signal belongs to the first administrator, then all the signatures in the database 105 are erased. Administrators who are not the first administrator can be granted either the same powers as the first administrator in regard to erasure of signatures, or can be granted the same powers as ordinary users in this respect.

Once the step 712 has completed erasure of the relevant signatures, then the method 700 follows an arrow 713 to 505 in FIG. 5.

Figure 8:
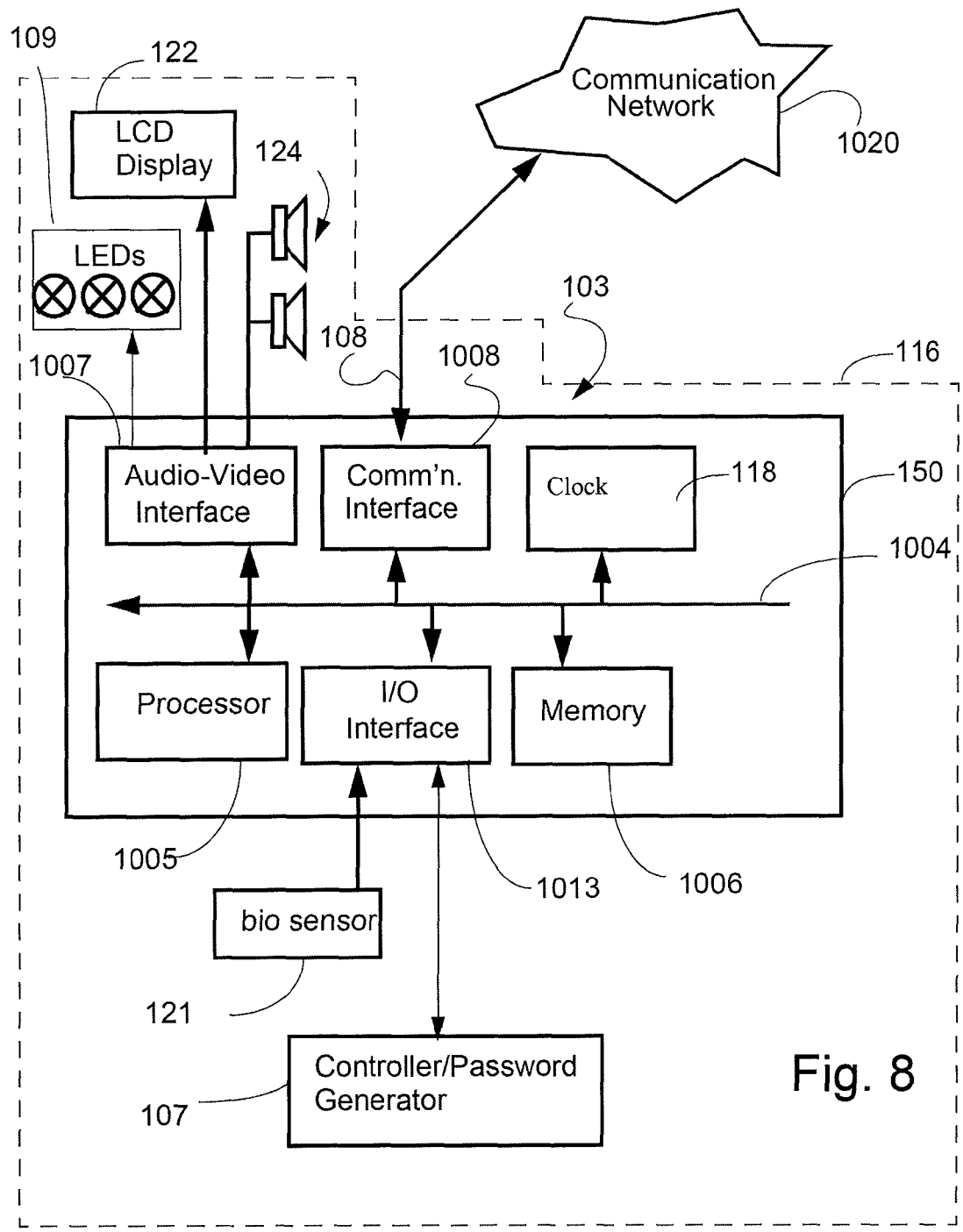
FIG. 8 is a schematic block diagram of a sub-system in FIG. 1.

FIG. 8 is a schematic block diagram of one arrangement of the sub-system 116 in FIG. 1. The disclosed secure access methods may be practiced using an arrangement, such as that shown in FIG. 8 wherein the described processes of FIGS. 3, 5-7, 10, 11 and 12 may be implemented as software, such as application program modules executing within the sub-system 116. In particular, the method steps for providing secure access are effected by instructions in the software that are carried out under direction of the processor 1005. The instructions may be formed as one or more code modules, each for performing one or more particular tasks. The software may also be divided into two separate parts, in which a first part performs the provision of secure access methods and a second part manages a user interface between the first part and the user. The software may be stored in a computer readable medium, including the storage devices described below, for example. The software is loaded into the first sub-system 116 from the computer readable medium, and then executed under direction of the respective processor 1005. A computer readable medium having such software or computer program recorded on it is a computer program product. The use of the computer program product in the computer preferably effects an advantageous apparatus for provision of secure access.

The following description is directed primarily to the first sub-system 116, however the description applies in general to the operation of the second sub-system 117. The system 100 is formed, having regard to the first sub-system 116, by the biometric module 103. The biometric module 103 comprises an embedded computer module 150, input devices such as the bio sensor 121, output devices including the LCD display 122, the LED indicators 109 and the audio device 124. A communication interface/transceiver 1008 may be used by the module 150 for communicating to and from a communications network 1020.

The embedded computer module 150 typically includes at least one processor unit 1005, the system clock 118 and a memory unit 1006, for example formed from semiconductor random access memory (RAM) and read only memory (ROM). In one arrangement, the user identity database 105 and the key database 113 may be configured within the memory 1006 of the module 150. The module 150 also includes a number of input/output (I/O) interfaces including an audio-video interface 1007 that couples to the LCD display 122, the LED indicators 109 and audio speaker 124, an I/O interface 1013 for the bio-sensor 121, and the interface 1008 for communications. The I/O interface 1013 is also used for communications between the processor 1005 and the controller/password generator 107.

The components 1005, 1006, 1007, 1008, 1013, 118 of the module 150 typically communicate via an interconnected bus 1004 and in a manner which results in a conventional mode of operation of the module 150 known to those in the relevant art.

Typically, the application program modules for the first sub-system 116 are resident in the memory 1006 (e.g., iROM), and are read and controlled in their execution by the processor 1005. Intermediate storage of the program and any data fetched from the bio sensor 121 and the network 1020 may be accomplished using the RAM in the semiconductor memory 1006. In some instances, the application program modules may be supplied to the user encoded into the ROM in the memory 1006. Still further, the software modules can also be loaded into the first sub-system 116 from other computer readable media, say over the network 1020. The term "computer readable medium" as used herein refers to any storage or transmission medium that participates in providing instructions and/or data to the first sub-system 116 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the first sub-system 116. Examples of transmission media include radio or infra-red transmission channels as well as a network connection to another computer or networked device, and the Internet or Intranets including e-mail transmissions and information recorded on Websites and the like.

The process 400 of FIG. 4 may be implemented using the second sub-system, as shown in FIG. 2 wherein the process 400 may be implemented as software, such as one or more application programs executable within the authentication server 200. In particular, the steps of process 400 are effected by instructions in the software that are carried out within the server 200. The instructions may be formed as one or more code modules, each for performing one or more particular tasks. The software may be stored in a computer readable medium, including the storage devices described below, for example. The software is loaded into the server 200 from the computer readable medium, and then executed by the server 200. A computer readable medium having such software or computer program recorded on it is a computer program product. The use of the computer program product in the server 200 preferably effects an advantageous apparatus for implementing the method 400.

As seen in FIG. 2, the authentication server 200 is formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from the personal computer 250 over the communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (eg: cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and read only memory (ROM). The module 201 also includes an number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or similar functionality. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the system 200.

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or alike computer systems evolved therefrom.

Typically, the application programs for the second subsystem 117 are resident on the hard disk drive 210 and read and controlled in execution by the processor 205. Intermediate storage of such programs and any data fetched from the networks 220 and 222 may be accomplished using the semiconductor memory 206, possibly in concert with the hard disk drive 210. In some instances, the application programs may be supplied to the user encoded on one or more CD-ROM and read via the corresponding drive 212, or alternatively may be read by the user from the networks 220 or 222. Still further, the software can also be loaded into the computer system 200 from other computer readable media. Computer readable media refers to any storage medium that participates in providing instructions and/or data to the computer system 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

As described above, the disclosed access system 100 can accommodate different classes of users, namely administrators, (ordinary) users (preferred or normal) and duress users. In one arrangement, the dynamic password generated at step 305 may depend on the class of the user 101. A particular unique dynamic password may be generated for each class of user. A unique password may be generated for a preferred ordinary user and a different password may be generated for a normal ordinary user. Based on the dynamic password received, the authentication server 200 can determine the class of the user that generated the password and grant various levels of access to the controlled application (e.g., the Internet banking application) to each of the different classes of user. As an example, members of a family or corporation may have different classes and therefore different levels of access to the controlled application. A father may be classed as a preferred ordinary user and have full access to the controlled application (e.g., access to all accounts held by the family), while a daughter may be classed as a normal ordinary user and have only partial access to the controlled application (e.g., access to only one of the accounts). Similarly, a Chief Executive Office (CEO) of a corporation may be classed as a preferred ordinary user and have full access to the controlled application (e.g., access to all accounts in the name of the corporation), while a manager may be classed as a normal ordinary user and have only partial access to the controlled application (e.g., access to only one of the accounts in the name of the corporation).

Similarly, a particular dynamic password may be generated for a duress user. In this instance, based on the dynamic password received, the authentication server 200 can determine that the user 101 was under duress and refuse access to the controlled application (e.g., the Internet banking application).

In order to implement these various levels of access to the controlled application, some of the steps of the method 300 may be modified. In particular, at step 302, upon the biometric signature matching being authenticated, the processor 1005 of the biometric module 103 may determine the class of the user that generated the biometric signal 102 based on the tag associated with the matched biometric signature in the database 105. For example, the biometric module 103 may determine that the user 101 is a preferred ordinary user.

Then at step 304, based on access bits in the authentication signal 106 received from the biometric module 103, the controller/password generator 107 accesses a key stored in the key database 113 where the accessed key is associated with the class of the user that generated the biometric signal 102. This association may also be indicated by a tag stored with the accessed key. For example, the controller/password generator 107 may access "a preferred user key" after determining from access bits in the authentication signal 106 that the user 101 is a preferred user. Also at step 304, the controller/password generator 107 determines the current time from the clock 118. The controller/password generator 107 may request this time from the processor 1005. In the subsequent step 305, the controller/password generator 107 generates a one-time password using the key (i.e., the preferred user key in the present example) and the current time. Again, the controller/password generator 107 may use the RSA encryption algorithm or any other suitable encryption algorithm.

Some of the steps of the method 400 are also modified in order to implement these various levels of access to the controlled application. In particular, at step 402, the processor 205 of the authentication server 200 accesses a key for each of the different classes of user associated with the biometric module 103, from the key database 251. In the present example, the authentication server 200 accesses a preferred ordinary user key, a normal ordinary user key and a duress key. The authentication server 200 also determines the current time from a system clock (not shown), at step 402.

Then at step 403, the processor 205 of the authentication server 200 generates a one-time password using each of the keys at step 402 and the current time determined at step 402. The authentication server 200 uses the same algorithm as that used at step 305 of the method 300. Accordingly, the authentication server 200 performs the same calculation as the controller/password generator 107 in determining the password. However, in the modified step 403, the authentication server 200 performs the calculation for each of the different classes of ordinary user (i.e., preferred ordinary user, normal ordinary user) and for the duress user associated with the biometric module 103. The result of step 402 is a preferred ordinary user password, a normal ordinary user password and a duress password.

In the subsequent step 404, the authentication server 200 compares the passwords generated at step 403 with the password received from the user in accordance with the password generated at step 305. A subsequent testing step 405 is performed by the authentication server 200. In the step 405 if the password received from the user is successfully matched against one of the passwords generated at step 403 then the process 400 is directed in accordance with a YES arrow to a step 407.

In the step 407, the authentication server 200 allows the user to access the controlled application (i.e., the Internet banking website) according to the class associated with the password matched with the received password at step 405. In the present example, the password generated at step 305 was a preferred ordinary user password. Therefore, the password matched with the received password at step 405 is a preferred ordinary user password generated by the authentication server 200 at step 403. Accordingly, the user who generated the biometric signal 102 is allowed full access to the controlled application.

In another example, if the controller 107 determines that the class of the user that generated the biometric signal 102 is duress, based on a duress bit included in the authentication signal 106, then at step 407, the user is refused access to the controlled application. In one arrangement, security and/or police forces may be dispatched to the address corresponding to the personal computer 250, upon the authentication server 200 matching the received password with a duress password at step 405.

Other arrangements may have many more than three classes of user. For example, the system 100 may have an administrator, a duress user, a preferred ordinary user, a normal ordinary user and several more classes of ordinary and/or administrator users.

In another arrangement, the class of the user who generated the biometric signal may be determined by the authentication server 200 based on the user's ID and fixed password, received at step 401. In this instance, the processor 205 of the authentication server 200 may access only one key at step 402 and generate one password at step 403. For example, the authentication server 200 may determine that the user 101 is a normal ordinary user, at step 401, based on the user's ID and fixed password. Then at step 402, the authentication server 200 accesses a normal ordinary user key and generates a normal ordinary user password at step 403. Accordingly, continuing the example, the user 101 is only allowed partial access to the controlled application at step 407.

Figure 9:
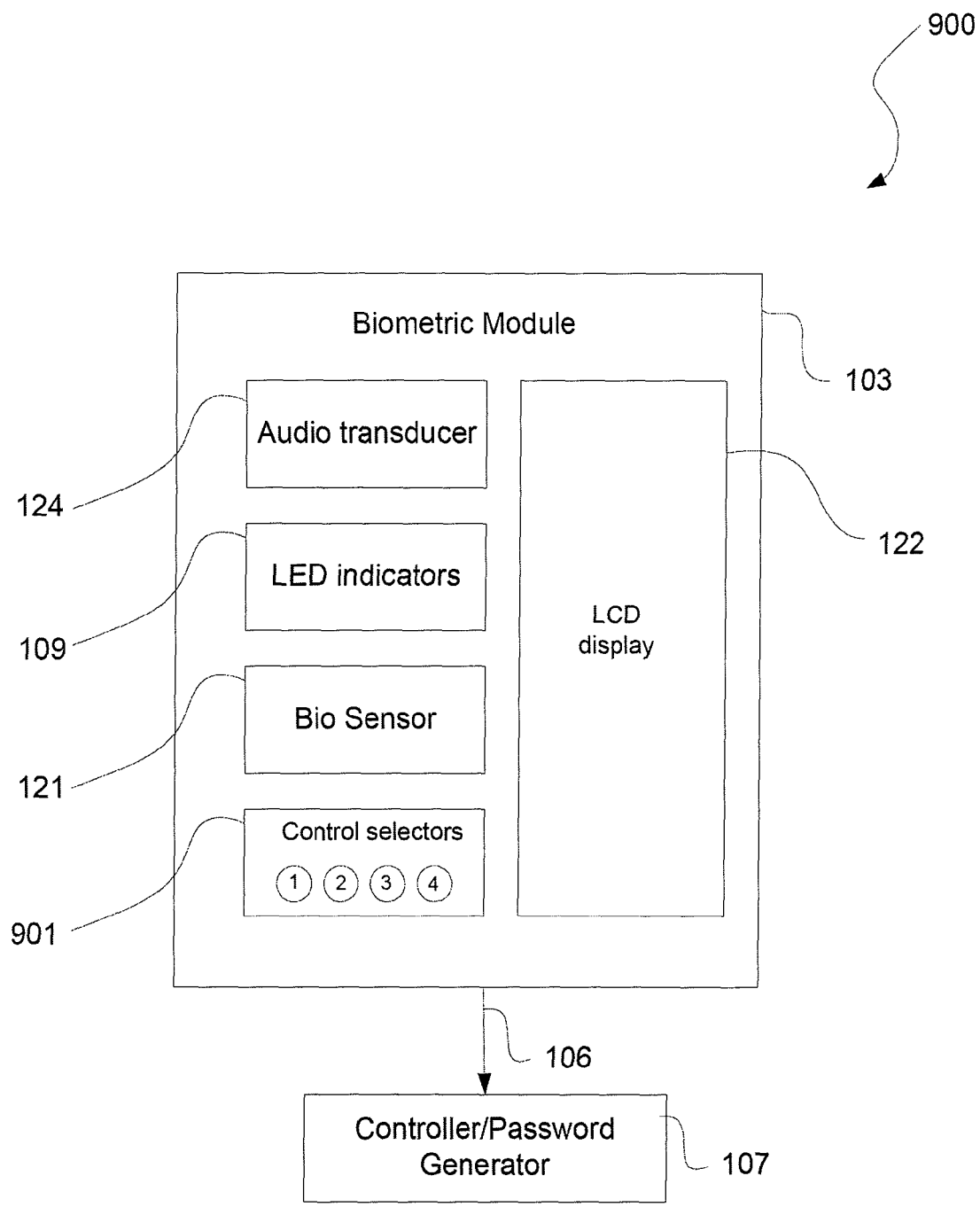
FIG. 9 shows the biometric module of FIG. 1 including selectors.

FIG. 9 shows the biometric module 103 of FIG. 1 together with the audio transducer 124, the LCD display 122, the LED indicators 109 and the bio sensor 121. In this arrangement 900, however, the biometric module 103 also has a set 901 of control selectors designated selectors 1-4 in the present example for selecting one or more control functions. A greater or smaller number of selectors can be incorporated as desired. Furthermore, the module 103 has an LCD display 122.

Once the identity of the user 101 is authenticated successfully, as described above, the user may select one of the set 901 of the selectors such as the selector designated "1". In response to such a selection, the biometric module 103 sends a signal (e.g., the authentication signal 106) to the controller 107. Upon receiving the signal, the controller 107 may generate a password as described above or perform one or more other control functions. Again, the biometric module 103 and the controller/password generator 107 may, for example, be incorporated within a remote fob or mobile telephone, together with the user ID database 105 and the key database 113.

The arrangement 900 of FIG. 9 can be used by a user 101, after biometric authentication, to select an appropriate service provider (such as VISA® MASTERCARD®, AMERICAN EXPRESS® and so on) by pressing the appropriate selector in the set 901 of selectors.

The LCD display 122 can show the user 101 which service provider has been selected.

The service providers may be from diverse fields, namely financial, security, automotive, individual identification and so on.

Security and payment functionality may be combined using one or more iterations of authentication and selection, thus facilitating operation with existing infrastructure. For example, the memory 1006 of the biometric module 103 may contain a stored unique number for use in secure access and/or a stored value for use in making cashless payments.

The user 101 may make a payment (e.g., a VISA® payment) at a conventional payment terminal or online by selecting the appropriate selector from the set 901, then pressing a suitable combination of the selectors 901 as guided by a display on the LCD screen 122 and waiting for a one-time password to be generated and shown on the display 122. The password may then be manually entered into the keyboard of the payment terminal or personal computer 250. This approach supports applications including business-to-business on line payments through to standard contact-less payments at existing payment terminals.

Figure 10:
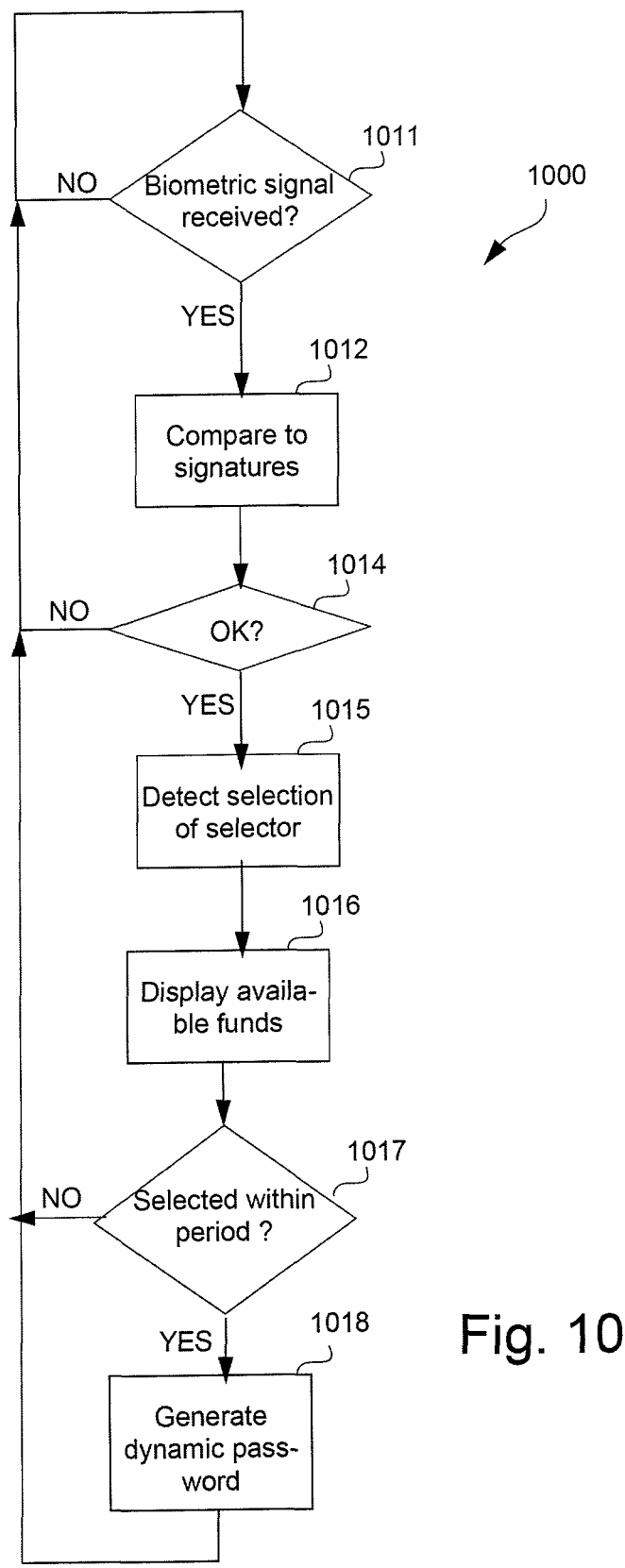
FIG. 10 shows an example of a method of operation of the arrangement of FIG. 9.

FIG. 10 shows a method 1000 of operation of the arrangement 900 of FIG. 9 according to one example. In the example of FIG. 10, the user 101 generates a dynamic password using the arrangement 900 of FIG. 9. The dynamic password may then be used for making an online payment to a business website. In the present example, the online payment is being made using a VISA® account. The example provides a secure scenario as a reference to a typical transaction. However, variations of the steps of the methods described herein include input from the user 101, biometric reads, generation of dynamic passwords and display of current account balances, which can be used to conduct various transactions.

The method 1000 of FIG. 10 may be implemented as software, such as application program modules being controlled in their execution by the processor 1005. The method 1000 commences with a testing step 1011 in which the processor 1005 in conjunction with the biometric sensor 121 in the biometric module 103 checks whether a biometric signal (or request) 102 is being received. If this is not the case, then the method 1000 is directed in accordance with a NO arrow back to the step 1011 in a loop. If, on the other hand, the biometric signal 102 has been received, then the method 1000 is directed in accordance with a YES arrow to a step 1012. At step 1012, the processor 1005 of the biometric module 103 compares the received biometric signal 102 with information in the biometric signature database 105 (configured within the memory 1006) in order to ensure that the biometric signal 102 received is that of the rightful user 101.

A subsequent testing step 1014 checks whether the comparison in the step 1012 yields the desired authentication. If the biometric signature matching is authenticated, then the method 1000 is directed in accordance with a YES arrow to a step 1015. At step 1015, the processor 1005 of biometric module 103 detects selection of one of the selectors of the set 801. In the present example, the selector "1" of the set 901 is selected. In response to selection of the selector "1", at the next step 1016, the processor 1005 displays a value, stored in the memory 1006, representing available funds. In the present example, the stored value (i.e., the value stored within the memory 1006 as described above) corresponding to the selector "1" may be used for making VISA® card payments. The value is displayed on the LCD 122. In the present example, the processor 1005 displays $156.56 which represents the balance of the user's VISA™ account.

At the next step 1017, if within a predetermined period of time (e.g., 30 seconds) the processor 1005 again detects selection of the same selector (i.e., selector "1") of the set 901, then the method 1000 is directed in accordance with a YES arrow to a step 1018. Otherwise, the method 1000 is directed in accordance with a NO arrow to the step 1011. At step 1018, the processor 1005 sends an authentication signal 106 to controller/password generator 107. Upon receipt of the authentication signal 106, the controller/password generator 107 generates a dynamic password (i.e., a first dynamic password), using the RSA encryption algorithm, as described above. The dynamic password is displayed on the LCD 122.

In the present example, the dynamic password generated at step 1018 is "2 3 4 9 8 7 8 9". The dynamic password will be different each time it is generated. The dynamic password may be a time-dependent password, as described above, where the current time (as determined from the clock 118) is used as the input value to the encryption process. As described above, the password may be dependent on the user 101 and the class (i.e., preferred or normal) of the user 101. The available funds (as represented by the stored value) and a unique token serial number are also preferably encrypted with the generated password. Alternatively, the dynamic password may be an event-synchronous password.

In accordance with the present example, the first dynamic password generated and displayed by the processor 1005 at step 1018 is entered into the personal computer 250 as shown in FIGS. 1 and 2, in order to make the online payment to the business website. The online payment is made in accordance with a method 1100 of making an online payment, which will be described in detail below with reference to FIG. 11. The method 1100 may be may be implemented using the authentication server 200, wherein the process of FIG. 11 may be implemented as software, such as one or more application programs executable within the computer system 200. In particular, the steps of method 1100 may be effected by instructions in the software that are carried out within the computer system 200. The instructions may be formed as one or more code modules, each for performing one or more particular tasks. The software may also be divided into two separate parts, in which a first part and the corresponding code modules performs the method 1100 and a second part and the corresponding code modules manage a user interface between the first part and the user. The software may be stored in a computer readable medium, including the storage devices described below, for example. One or more portions of the software may be stored within the computer module 201, as will be described below. The software is loaded into the computer system 200 from the computer readable medium, and then executed by the computer system 200.

Figure 11:
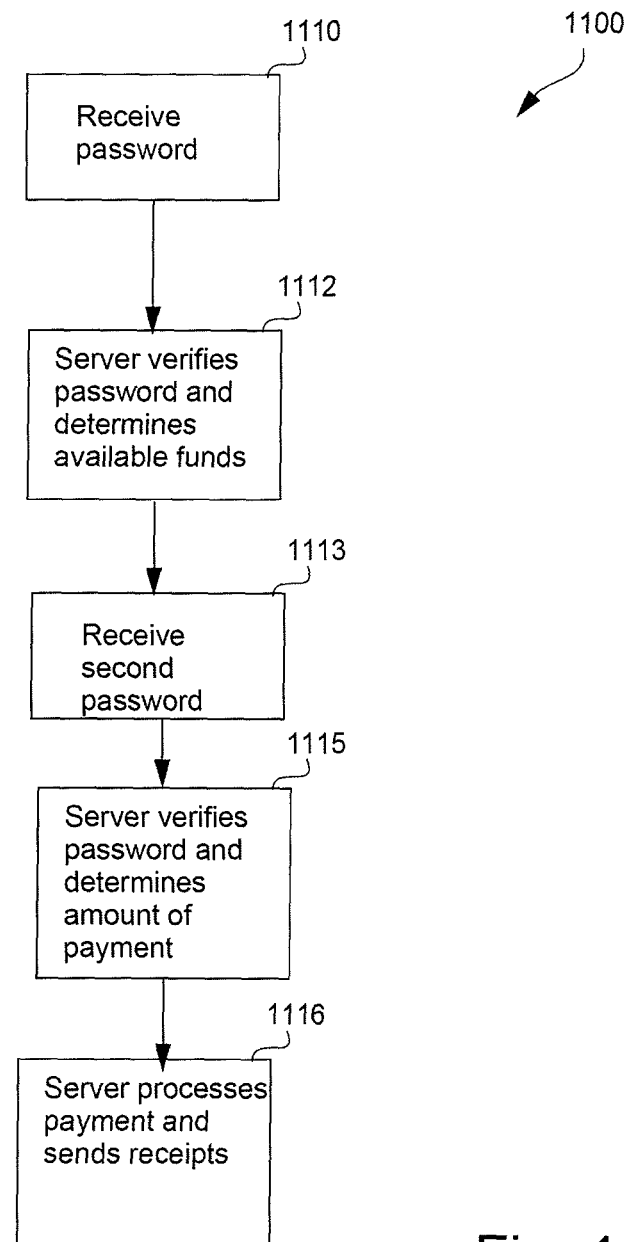
FIG. 11 shows an example of a method of making an online payment using the arrangement of FIG. 9.

The method 1100 may alternatively be implemented in dedicated hardware such as one or more integrated circuits performing the functions or sub functions of FIG. 11. Such dedicated hardware may include graphic processors, digital signal processors, or one or more microprocessors and associated memories.

The method 1100 begins at step 1110, where after receiving the first password from the personal computer 250 (i.e., as entered into the computer 250 by the user 101), the method 1100 proceeds to step 1112. At step 1112, the processor 205 of the server 200 verifies the password entered by the user 101 by generating another dynamic password and comparing the passwords as described above with reference to FIG. 4. In order to generate the password, the processor 205 of the authentication server 200 accesses a key (associated with the user 101 of the biometric module 103) stored in the key database 251 and determines the current time from a system clock (not shown). In the present example, the key database 251 may be configured within the hard disk drive 210 of the authentication server 200. The server 200 generates the password using the key and the current time determined by encrypting a value representing the current time, using the RSA encryption algorithm, which is the same encryption algorithm used by the controller 107. Also at step 1112, the processor 205 of the authentication server 200 determines available funds (i.e. $156.56) by determining the amount encrypted within the password entered by the user 101.

Figure 12:
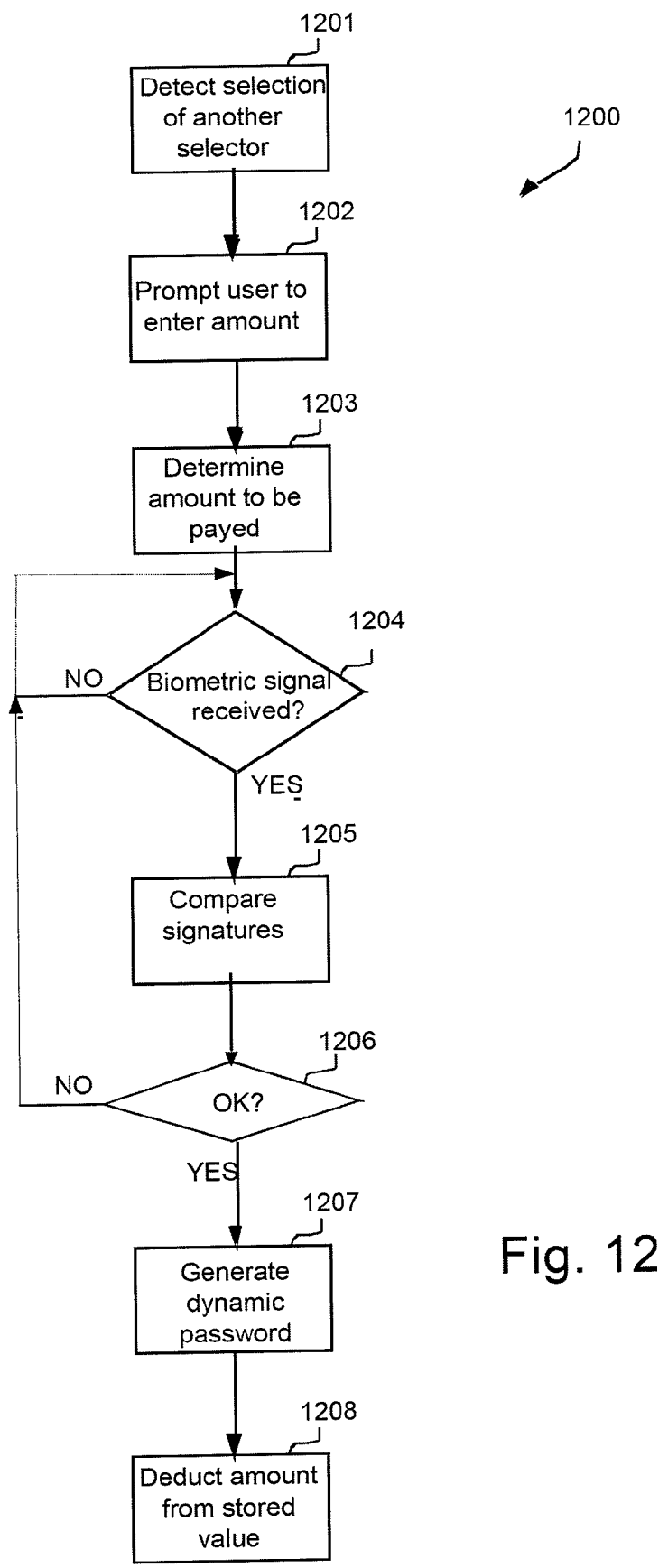
FIG. 12 shows an example of a method of debiting an amount of funds from an account stored within the sub-system of FIG. 9.

Once the dynamic password is entered into the personal computer 250 and verified by the authentication server 200, the user 101 makes another request using the arrangement 900 of FIG. 9 in order to select the amount of funds wishing to be debited from their account. The amount of funds selected by the user 101 is then debited from the value, stored in the memory 1006 of the biometric module 103, corresponding to their account. FIG. 12 shows a method 1200 of debiting an amount of funds from an account.

The method 1200 commences at step 1201, where the processor 1005 detects selection of another one of the selectors of the set 801. In the present example, the selector "2" of the set 901 is selected. In response to selection of the selector "2", at the next step 1202, the processor 1005 prompts the user 101 to enter the amount that they wish to pay which also represents the amount to be debited from their account (i.e. their VISA® account).

At the next step 1203, the processor 1005 determines the amount wished to be payed based on an amount entered by the user 101 and displays this amount on the LCD 122. The user may enter the amount using the set of control selectors 901. For example, the processor 1005 may display a generic amount and the user may select "3" of the set 801 to increase a displayed amount and "4" to decrease the displayed amount.

The next step 1204 is a testing step in which the biometric sensor 121 in the biometric module 103 checks whether a biometric signal 102 is being received. If this is not the case, then the method 1200 is directed in accordance with a NO arrow back to the step 1206 in a loop. If, on the other hand, the biometric signal 102 has been received, then the method 1200 is directed in accordance with a YES arrow to a step 1205. The step 1205 compares the received biometric signal 102 with information in the biometric signature database 105 in order to ensure that the biometric signal received is that of the rightful user 101.

A subsequent testing step 1206 checks whether the comparison in the step 1205 yields the desired authentication. If the biometric signature matching is authenticated, then the method 1200 is directed in accordance with a YES arrow to a step 1207. At step 1207, the processor 1005 generates a second dynamic password, using the RSA encryption algorithm with the current time being used as the input value to the encryption process, as described above. The dynamic password is displayed on the LCD 802. In the present example, the dynamic password generated at step is "5 6 8 8 8 1 8 9". Again, the second dynamic password is a time-dependent password. Alternatively, the second password may be an event-synchronous password. The amount determined at step 1203 representing the amount of funds to be payed is also encrypted within the dynamic password. The method 1200 concludes at the next step 1208, where the amount of funds entered by the user at step 1203 is deducted from the value stored in the memory 1006 of the biometric module 103.

In accordance with the present example, the second dynamic password generated and displayed by the processor 105 at step 1207 is entered into the personal computer 250 to complete the online payment to the business website.

Returning to FIG. 11, at the next step 1113, after receiving the second dynamic password from the personal computer 250 (i.e., the second dynamic password entered by the user 101), the method 1000 proceeds to step 1115. At step 1115, the authentication server 200 verifies the password entered by the user 101 by generating still another dynamic password and comparing the passwords as described above. In order to generate this still further password, the server 200 accesses the key (associated with the user 101 of the biometric module 103) stored in the key database 251 and determines the current time from the system clock, as described above. Also at step 1115, the processor 205 of the authentication server 200 determines the amount to be paid by decrypting the amount from the second password entered by the user 101 and received at step 1113.

The method 1100 concludes at the next 1116, where the payment is processed by the authentication server 200. The payment transaction can be reconciled to the customer in a monthly statement.

Variations on the methods described above can also be used for secure access, for example, to gain entry to a building or room. For example, the dynamic password generated at step 305 or at step 1018 may be entered into a keypad located on a door jamb and being connected to a building security system. In this instance, rather than representing an account balance, the stored value encrypted within the dynamic password can be a personal identification number (PIN) stored within the transmitter sub-system 116. The building security system then verifies the password entered by the user 101 by generating another dynamic password and comparing the passwords. Thus, the PIN used for secure access is enhanced through the need of a biometric signature.

The dynamic passwords generated at step 305 and 1018 may have other user information encrypted within the dynamic password including a serial number related to the transmitter sub-system 116 (configured within a telephone or fob), time of access, type of account and validated finger (e.g., middle finger).

In one arrangement, the dynamic password generated at step 305 or step 1018 may be dependent on the user 101 providing a sequence of biometric signals. For example, the user 101 may be required to provide a legitimate sequence of finger presses at steps 301 to 303, before the dynamic password is generated at step 305.

The arrangements described above, including the system 100 and the arrangement 900, may also be used with automatic teller machines (ATMs) or point of sale (POS) devices where a personal identification number (PIN) has conventionally been used to verify the validity of a card (i.e., magnetic stripe card or smart card) owner. The dynamic password generated on the basis of a valid biometric reading may be used to replace such a PIN, without affecting a conventional transaction. For example, in the case of an ATM transaction or electronic funds transfer point of sale (EFTPOS) transaction, a user inserts their magnetic stripe card (or smart card) into the ATM or swipes the card using an EFTPOS terminal. A card number corresponding to the magnetic stripe card is stored in the memory 1006 of the biometric module 103. At the same time as inserting or swiping their card, the user may use the system 100 or the arrangement 900 described above to generate a time-dependent or event-synchronous dynamic password based on a valid biometric reading. Again, the card number corresponding to the magnetic stripe card may be encrypted within the generated password. The user then enters the generated dynamic password into the ATM or EFTPOS terminal. The dynamic password is then verified by a back-end host server (e.g., the authentication server 200 associated with a bank) in the manner described above based on the card number.

The arrangements described above, including the system 100 and the arrangement 900, may also be used for making an online payment. Again, the dynamic password may be used to replace the user's password which has conventionally been used. At the same time as logging into a banking website, for example, the user may use the system 100 or arrangement 900 described above to generate a time-dependent or event-synchronous dynamic password based on a valid biometric reading. Again, a user identification number corresponding to the user may be encrypted within the generated password. The user then enters the generated dynamic password into a personal computer such as the personal computer 250. The dynamic password is then verified by a back-end host server (e.g., the authentication server 2000 associated with a bank) connected to the personal computer 250 in the manner described above based on the user's identification number encrypted with the entered password.

The dynamic password generated at step 305 or at step 1018 may be entered into a personal computer such as the personal computer 250 when logging into a local or wide corporate network. In this instance, rather than representing an account balance, the stored value encrypted within the dynamic password can be a personal identification number (PIN) or Login for the employee stored within the transmitter sub-system 116. The corporate network then verifies the password entered by the user 101 by generating another dynamic password and comparing the passwords. Thus, the PIN or Login used for secure access to a corporate network is enhanced through the need of a biometric signature.

The arrangements described above may stop intruders from stealing credit and debit cards for later fraudulent use in ATM and POS devices. The owner or user of a magnetic stripe card would also require the fob or mobile telephone with the card number corresponding to the magnetic stripe card stored thereon. A new dynamic password could then be generated for each ATM or EFTPOS transaction. The dynamic password overcomes the inherent weaknesses in PIN type inputs, due to the dynamic nature of the password and requirement to validate the owner or user biometrics prior to generating that password. If an intruder views a dynamic password input, they cannot replicate it a next time as the password is constantly changing.

The arrangements described above allow biometric security to be easily integrated with existing infrastructure for payment or access systems. The arrangements are simple and effective for secure proof of identity. The user does not need to remember a code, number, name or combination. The arrangements may be used online or offline. The described arrangements may also be used in wireless systems, alarm panel activation, garage control, door access, boom-gate access and anywhere long distance secure transmissions are required.

In another arrangement, rather than requiring a biometric signature match for the password to be generated (as at steps 305 and 1018), the password may be generated based on a personal identification number (PIN). For example, the user 101 may enter a PIN using the control selectors 901 rather than providing a biometric request. Upon the PIN being authenticated by the module 103, the password would be generated (i.e., without the need to supply a biometric request) and may then be supplied to the authentication server 200 in the manner described above. In this instance, the module 103 does not need the biometric sensor 121.

INDUSTRIAL APPLICABILITY

It is apparent from the above that the arrangements described are applicable to the security industry.

The foregoing describes only some embodiments of the present invention, and modifications and/or changes can be made thereto without departing from the scope and spirit of the invention, the embodiments being illustrative and not restrictive.

The system 100 can also be used to provide authorised access to computing devices, applications or networks, lighting systems, building control devices, exterior or remote devices such as air compressors and so on. The concept of "secure access" is thus extendible beyond mere access to restricted physical areas.

The invention claimed is:

1. A system for providing secure access to a controlled software application, the system comprising:
    a database of one or more biometric signatures;
    a first sub-system comprising:
        a biometric sensor for receiving a biometric signal associated with a user wherein each user is classified into one of a plurality of classes, each class being associated with one of a plurality of levels of access to the controlled application;
        means for matching the biometric signal against members of the database of biometric signatures;
        means for determining the class into which the user is classified, in an event that the biometric signal matches one of the members of the database of biometric signatures; and
        means for selecting an encryption key for use in accessing the controlled application, the encryption key being selected from a plurality of predetermined encryption keys stored on said first sub-system, wherein the encryption key is selected depending on the class into which the user is classified;
        means for generating a password according to an encryption process based on a dynamic input value and the selected encryption key; and
    a second sub-system comprising;
        means for receiving the password; and
        means for providing access to the user to the controlled software application at a level of access dependent upon said password and on said class determined for the user.

2. A system according to claim 1, wherein the controlled software application is executing on said second sub-system.

3. A system according to claim 1, wherein the encryption process is a time dependent process.

4. A system according to claim 1, wherein the encryption process is an event-synchronous process.

5. A system according to claim 1, wherein the first sub-system further comprises means for populating the database of biometric signatures.

6. A system according to claim 2, wherein the means for populating the database of biometric signatures comprises:
    means for receiving a series of entries of the biometric signal, said series being characterised according to at least one of the number of said entries and a duration of each said entry;
    means for mapping said series into an instruction; and
    means for populating the database according to the instruction.

7. A system according to claim 4, wherein the database of biometric signatures comprises signatures in at least one of a system administrator class and a system user class.

8. A system according to claim 1, wherein the controlled software application is an Internet banking website.

9. A system according to claim 1, wherein the biometric sensor is responsive to one of a fingerprint pattern, voice, retinal pattern, iris pattern, face pattern, vein pattern and palm configuration.

10. A system according to claim 1, wherein the database of biometric signatures is located in the first sub-system.

11. A first sub-system for operating in a system for providing secure access to a controlled software application, the system comprising a database of biometric signatures, a second sub-system comprising means for receiving a password, and means for providing a user with access to the controlled software application dependent upon the password and on a class determined for the user, the first subsystem comprising:
    a biometric sensor for receiving a biometric signal associated with the user wherein each user is classified into one of a plurality of classes, each class being associated with one of a plurality of levels of access to the controlled application;
    means for matching the biometric signal against members of the database of biometric signatures;
    means for determining the class into which the user is classified, in an event that the biometric signal matches one of the members of the database of biometric signatures;
    means for selecting an encryption key for use in accessing the controlled application, the encryption key being selected from a plurality of predetermined encryption keys stored on said first sub-system, wherein the encryption key is selected depending on the class into which the user is classified; and
    means for generating the password according to an encryption process based on a dynamic input value and the selected encryption key.

12. A password generator for providing secure access to a controlled software application executing within a system, the system comprising a database of biometric signatures, a sub-system comprising means for receiving the password, and means for providing a user with access to the controlled software application at a level of access dependent upon the password and on a class determined for the user, said password generator comprising:
    a biometric sensor for receiving a biometric signal associated with the user, wherein each user is classified into one of a plurality of classes, each class being associated with one of a plurality of levels of access to the controlled application;
    a processor for executing a computer program, said computer program comprising instructions for:
    matching the biometric signal against members of the database of biometric signatures,
    determining the class into which the user is classified, in an event that the biometric signal matches one of the members of the matched database of biometric signatures,
    selecting an encryption key for use in accessing the controlled application, the encryption key being selected from a plurality of predetermined encryption keys stored in said password generator, wherein the encryption key is selected depending on the class into which the user is classified; and generating the password according to an encryption process based on a dynamic input value and the selected encryption key.

13. A method for providing secure access to a controlled software application using a password generator, the method comprising the steps of:

receiving a biometric signal associated with a user wherein each user is classified into one of a plurality of classes, each class being associated with one of a plurality of levels of access to the controlled application;

matching the biometric signal against members of a database of biometric signatures;

determining the class into which the user is classified, in an event that the biometric signal matches one of the members of the database of biometric signatures;

selecting an encryption key for use in accessing the controlled application, the encryption key being selected from a plurality of predetermined encryption keys stored on said password generator, wherein the encryption key is selected depending on the class into which the user is classified;

generating a password according to an encryption process based on a dynamic input value and the selected encryption key, said password being dependent on the class into which the user is classified; and providing access to the user to the controlled software application at a level of access dependent upon said password and on said class determined for the user.

14. A method according to claim 13, wherein the controlled software application is executing on a server.

15. A method according to claim 13, wherein the encryption process is a time dependent process.

16. A method according to claim 13, wherein the encryption process is an event-synchronous process.

17. A method according to claim 13, wherein the database of biometric signatures comprises signatures in at least one of a system administrator class and a system user class.

18. A method according to claim 13 said method further comprising:

receiving a series of biometric signal entries for the user;

determining the number of said signal entries received and/or a period of time for which each of said signal entries was received;

mapping said series of biometric signals into an instruction, depending on the determined number and/or determined period; and populating the database according to the instruction.

19. A method of generating a password in a system for providing secure access to a user to a controlled software application, the system comprising a database of biometric signatures, a first sub-system comprising means for receiving the password generated by a second sub-system, and means for providing access to the user to the controlled software application at a level of access dependent upon the password and on a class determined for the user, said method comprising:

receiving a biometric signal by biometric sensor associated with the user wherein each user is classified into one of a plurality of classes, each class being associated with one of a plurality of levels of access to the controlled application;

matching the biometric signal against members of the database of biometric signatures means for determining the class into which the user is classified, in an event that the biometric signal matches one of the members of the database of biometric signatures;

means for selecting an encryption key for use in accessing the controlled application, the encryption key being selected from a plurality of predetermined encryption keys stored on said second sub-system, wherein the encryption key is selected depending on the class into which the user is classified; and generating the password according to an encryption process based on a dynamic input value and the selected encryption key.

20. A non-transitory computer readable medium having a computer program recorded therein for directing a processor to provide secure access to a controlled software application, said computer program product comprising:

code for receiving a biometric signal associated with a user wherein each user is classified into one of a plurality of classes, each class being associated with one of a plurality of levels of access to the controlled application;

code for matching the biometric signal against members of a database of biometric signatures;

code for determining the class into which user is classified, in an event that the biometric signal matches one of the members of the database of biometric signatures;

code for selecting an encryption key for use in accessing the controlled application, the encryption key being selected from a plurality of predetermined encryption keys, wherein the encryption key is selected depending on the class into which the user is classified;

code for generating a password according to an encryption process based on a dynamic input value and the selected encryption key; and code for providing access to the user to the controlled software application dependent upon said password and on said class determined for the user.

21. A computer readable medium according to claim 20, said program comprising:

code for receiving a series of entries of the biometric signal;

code for determining of the number of said signal entries received and/or a period of time for which each of said signal entries was received;

code for mapping said series of biometric signals into an instruction depending on the determined number and/or the determined period; and code for populating the database according to the instruction.

22. A non-transitory computer readable medium having a computer program recorded therein for directing a processor to generate a password for providing secure access to a controlled software application, said computer program product comprising:

code for receiving a biometric sensor by biometric signal associated with a user, wherein each user is classified into one of a plurality of classes, each class being associated with one of a plurality of levels of access to the controlled application;

code for matching the biometric signal against members of the database of biometric signatures;

code for determining the class into which the user is classified, in an event that the biometric signal matches one of the members of the database of biometric signatures;

code for selecting an encryption key for use in accessing the controlled application, the encryption key being selected from a plurality of predetermined encryption keys, wherein the encryption key is selected depending on the class into which the user is classified; and code for generating the password according to an encryption process based on a dynamic input value and the selected encryption.

* * * * *